United States Patent
Zhou et al.

(10) Patent No.: US 9,699,713 B2
(45) Date of Patent: Jul. 4, 2017

(54) ENHANCED TRIGGER FRAME BASED DISCOVERY FOR A NEIGHBOR AWARENESS NETWORK

(71) Applicant: QUALCOMM Incorporated, San Diego, CA (US)

(72) Inventors: Yan Zhou, San Diego, CA (US); Santosh Paul Abraham, San Diego, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 14/628,158

(22) Filed: Feb. 20, 2015

(65) Prior Publication Data

US 2015/0245335 A1 Aug. 27, 2015

Related U.S. Application Data

(60) Provisional application No. 61/945,798, filed on Feb. 27, 2014.

(51) Int. Cl.
*H04L 12/28* (2006.01)
*H04W 48/16* (2009.01)
(Continued)

(52) U.S. Cl.
CPC .......... *H04W 48/16* (2013.01); *H04B 7/0617* (2013.01); *H04L 1/00* (2013.01);
(Continued)

(58) Field of Classification Search
CPC ..... H04W 48/16; H04W 8/005; H04W 64/00; H04W 16/28; H04W 4/023; H04W 84/18;
(Continued)

(56) References Cited

U.S. PATENT DOCUMENTS

2012/0320790 A1* 12/2012 Shaffer ............... H04W 40/246
370/254
2013/0059544 A1* 3/2013 Chen ..................... H04W 8/005
455/67.11
(Continued)

FOREIGN PATENT DOCUMENTS

EP 2587848 A1 5/2013
EP 2793521 A1 10/2014
(Continued)

OTHER PUBLICATIONS

Felemban E., et al., "SAND: Sectored-Antenna Neighbor Discovery Protocol for Wireless Networks", 7th Annual IEEE Communications Society Conference on Sensor Mesh and Ad Hoc Communications and Networks (SECON), 2010, IEEE, Piscataway, NJ, USA, Jun. 21, 2010 (Jun. 21, 2010), pp. 1-9, XP031707840, ISBN: 978-1-4244-7150-8.
(Continued)

*Primary Examiner* — Clemence Han
(74) *Attorney, Agent, or Firm* — Arent Fox

(57) ABSTRACT

When a first node cannot hear a second node, the second node is "hidden" to the first node. In response to receiving a trigger frame, the two nodes may inadvertently transmit response frames at approximately the same time. The response frames may collide with each other, thereby causing delays in node discovery in a NAN. Provided herein are methods, apparatuses, and computer program products for reducing collisions in wireless communication. In some configurations, nodes may receive trigger frames that indicate a reduction in the rate that response frames are transmitted when traffic load conditions are high. In some configurations, nodes located in different coverage areas (e.g., a "hidden area" and a "non-hidden area") may transmit response frames at different times. In some configurations, the nodes may refrain from transmitting their response
(Continued)

frames upon hearing that another node having a higher serving preference rank is transmitting.

13 Claims, 12 Drawing Sheets

(51) Int. Cl.
    *H04L 12/825*     (2013.01)
    *H04W 64/00*     (2009.01)
    *H04B 7/06*     (2006.01)
    *H04W 8/00*     (2009.01)
    *H04L 1/00*     (2006.01)
    H04L 29/08     (2006.01)
    H04W 4/02     (2009.01)
    H04W 16/28     (2009.01)
    H04W 84/18     (2009.01)
    H04W 74/08     (2009.01)

(52) U.S. Cl.
    CPC ............. *H04L 47/26* (2013.01); *H04W 8/005* (2013.01); *H04W 64/00* (2013.01); *H04L 67/16* (2013.01); *H04W 4/023* (2013.01); *H04W 16/28* (2013.01); *H04W 74/0808* (2013.01); *H04W 84/18* (2013.01)

(58) Field of Classification Search
    CPC   H04L 1/00; H04L 47/26; H04L 67/16; H04B 7/0617
    See application file for complete search history.

(56) References Cited

U.S. PATENT DOCUMENTS

| | | | |
|---|---|---|---|
| 2013/0231151 A1* | 9/2013 | Kneckt | ............... H04W 40/246 455/515 |
| 2013/0346207 A1 | 12/2013 | Qi et al. | |
| 2014/0254566 A1 | 9/2014 | Qi et al. | |
| 2014/0269670 A1 | 9/2014 | Park et al. | |
| 2014/0321317 A1 | 10/2014 | Kasslin et al. | |
| 2014/0328168 A1 | 11/2014 | Park et al. | |
| 2016/0192273 A1* | 6/2016 | Oren | ................... H04W 40/244 370/329 |

FOREIGN PATENT DOCUMENTS

| | | |
|---|---|---|
| WO | 07078177 | 7/2007 |
| WO | 2011141844 A1 | 11/2011 |
| WO | 2013107398 A1 | 7/2013 |

OTHER PUBLICATIONS

International Search Report and Written Opinion—PCT/US2015/018157—ISA/EPO—May 28, 2015.

* cited by examiner

ENHANCED TRIGGER FRAME BASED DISCOVERY FOR A NEIGHBOR AWARENESS NETWORK

CROSS-REFERENCE TO RELATED APPLICATION

This application claims the benefit of U.S. Provisional Application Ser. No. 61/945,798, entitled "Enhanced Triggering Frame Based Discovery for a Neighbor Awareness Network" and filed on Feb. 27, 2014, which is expressly incorporated by reference herein in its entirety.

BACKGROUND

Field

The present disclosure relates generally to communication systems, and more particularly, to an enhanced trigger frame based discovery for a neighbor awareness network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

SUMMARY

The systems, methods, computer program products, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., a user equipment (UE)) for wireless communication including a processing system. The processing system of the UE is configured to transmit a first trigger frame that includes a first criterion associated with a first area. The first trigger frame is intended to trigger a first response frame from a first node in the first area. The processing system is also configured to transmit a second trigger frame that includes a second criterion associated with a second area. The second trigger frame is intended to trigger a second response frame from a second node in the second area.

Another aspect of this disclosure provides an apparatus for wireless communication. The apparatus includes a means for transmitting a first trigger frame comprising a first criterion associated with a first area, wherein the first trigger frame is intended to trigger a first response frame from a first node in the first area. The apparatus includes a means for transmitting a second trigger frame comprising a second criterion associated with a second area, wherein the second trigger frame is intended to trigger a second response frame from a second node in the second area. In an aspect, the first area is located within a radial distance threshold relative to the UE, and the second area is located beyond the radial distance threshold. In another aspect, the first trigger frame indicates a received signal strength indicator (RSSI) threshold, and the second trigger frame does not indicate the RSSI threshold or indicates a null value for the RSSI threshold. In another aspect, the first trigger frame indicates a first RSSI range, wherein the first trigger frame is intended to trigger the first response frame from the first node in the first area based on the first RSSI range, and the second trigger frame indicates a second RSSI range, wherein the second trigger frame is intended to trigger the second response frame from the second node in the second area based on the second RSSI range. In another aspect, the second trigger frame includes feedback information associated with traffic load conditions at the apparatus. In another aspect, the first trigger frame indicates an RSSI threshold, and the apparatus further includes means for receiving the first response frame from the first node, wherein the first response frame comprises an identifier of one or more other nodes located near the first node, wherein an RSSI at the first node is greater than the RSSI threshold, and wherein the second trigger frame is transmitted with the identifier of each of the one or more other nodes, and means for receiving a response frame from the one or more other nodes. In another aspect, the apparatus includes means for receiving the first response frame from the first node when a first RSSI at the first node is greater than the first criterion, the first criterion being a first RSSI threshold, wherein the second trigger frame is transmitted with an identifier associated with the first node and with a second RSSI threshold, and means for receiving the second response frame from the second node when a second RSSI between the second node and the first node is greater than or equal to the second RSSI threshold transmitted in the second trigger frame. In another aspect, the apparatus includes means for receiving a list from the first node in the first area when an RSSI at the first node is greater than an RSSI threshold, the list comprising an identifier of one or more other nodes previously discovered by the first node, wherein the second node is one of the one or more other nodes, and means for scheduling a time slot for the transmission of the second response frame by the second node using the received list. In another aspect, the first area is a first circular sector and the second area is a second circular sector different from the first circular sector. In another aspect, the first and second trigger frames include information corresponding to a location of the apparatus, the first trigger frame indicates a first time slot for receiving the first response frame based on a location of the first node relative to the location of the apparatus, and the second trigger frame indicates a second time slot for receiving the second response frame based on a location of the second node relative to the location of the apparatus. In another aspect, the first area is a first beam-formed sector and the second area is a second beam-formed sector different from the first beam-formed sector. In another aspect, the first trigger frame is transmitted to the first node located in the first beam-formed sector at a first time, and the second trigger frame is transmitted to the second node located in the second beam-formed sector at a second time different from the first time.

Another aspect of this disclosure provides a computer-readable medium of a UE storing computer executable code for wireless communication, comprising code for transmitting a first trigger frame comprising a first criterion associated with a first area, wherein the first trigger frame is intended to trigger a first response frame from a first node in the first area, and transmitting a second trigger frame comprising a second criterion associated with a second area, wherein the second trigger frame is intended to trigger a second response frame from a second node in the second area. In an aspect, the first area is located within a radial distance threshold relative to the UE, and the second area is located beyond the radial distance threshold. In another aspect, the first trigger frame indicates an RSSI threshold, and the second trigger frame does not indicate the RSSI threshold or indicates a null value for the RSSI threshold. In another aspect, the first trigger frame indicates a first RSSI range, wherein the first trigger frame is intended to trigger the first response frame from the first node in the first area based on the first RSSI range, and the second trigger frame indicates a second RSSI range, wherein the second trigger frame is intended to trigger the second response frame from the second node in the second area based on the second RSSI range. In another aspect, the second trigger frame includes feedback information associated with traffic load conditions at the apparatus. In another aspect, the first trigger frame indicates an RSSI threshold, and the computer-readable storage medium further comprises code for receiving the first response frame from the first node, the first response frame comprising an identifier of one or more other nodes located near the first node, wherein an RSSI at the first node is greater than the RSSI threshold, and wherein the second trigger frame is transmitted with the identifier of each of the one or more other nodes, and receiving a response frame from the one or more other nodes. In another aspect, the computer-readable storage medium further comprises code for receiving the first response frame from the first node when a first RSSI at the first node is greater than the first criterion, the first criterion being a first RSSI threshold, wherein the second trigger frame is transmitted with an identifier associated with the first node and with a second RSSI threshold, and receiving the second response frame from the second node when a second RSSI between the second node and the first node is greater than or equal to the second RSSI threshold transmitted in the second trigger frame. In another aspect, the computer-readable storage medium further comprises code for receiving a list from the first node in the first area when an RSSI at the first node is greater than an RSSI threshold, the list comprising an identifier of one or more other nodes previously discovered by the first node, wherein the second node is one of the one or more other nodes, and scheduling a time slot for the transmission of the second response frame by the second node using the received list. In another aspect, the first area is a first circular sector and the second area is a second circular sector different from the first circular sector. In another aspect, the first and second trigger frames include information corresponding to a location of the UE, the first trigger frame indicates a first time slot for receiving the first response frame based on a location of the first node relative to the location of the UE, and the second trigger frame indicates a second time slot for receiving the second response frame based on a location of the second node relative to the location of the UE. In another aspect, the first area is a first beam-formed sector and the second area is a second beam-formed sector different from the first beam-formed sector. In another aspect, the first trigger frame is transmitted to the first node located in the first beam-formed sector at a first time, and the second trigger frame is transmitted to the second node located in the second beam-formed sector at a second time different from the first time.

Another aspect of the disclosure provides an apparatus (e.g., a UE) for wireless communication including a processing system. The processing system of the UE is configured to receive a trigger frame that includes a criterion associated with an area. The processing system is configured to determine whether the trigger frame is intended for the UE based on the criterion in the trigger frame. The processing system is configured to transmit a response frame when the trigger frame is intended for the UE.

Another aspect of the disclosure provides an apparatus for wireless communication. The apparatus includes means for receiving a trigger frame comprising a criterion associated with an area, means for determining whether the trigger frame is intended for the apparatus based on the criterion in the trigger frame, and means for transmitting a response frame when the trigger frame is intended for the apparatus. In an aspect, the criterion is an RSSI threshold. In another aspect, the trigger frame indicates whether to enable a collision-mitigation procedure, and the transmission of the response frame is in accordance with a collision-mitigation procedure. In another aspect, the transmission in accordance with the collision-mitigation procedure comprises at least one of a selection of a random start time (e.g., a random carrier sense multiple access (CSMA) time) in a discovery window for transmitting the response frame or an implementation of a request-to-send/clear-to-send (RTS/CTS) procedure for transmitting the response frame. In another aspect, the apparatus includes means for receiving feedback information associated with traffic load conditions, and means for adjusting parameters associated with the transmission of the response frame using the feedback information. In another aspect, the response frame is transmitted at a time based on a location of the apparatus relative to a location of the transmitter of the trigger frame. In another aspect, the response frame is transmitted at a time based on a location of the apparatus in a beam-formed sector. In another aspect, the apparatus includes means for refraining from transmitting a response frame when a serving preference rank of the apparatus is lower than serving preference ranks of neighbor nodes that previously sent response frames received by the apparatus.

Another aspect of the disclosures provides for a computer-readable medium of a UE storing computer executable code for wireless communication, comprising code for receiving a trigger frame comprising a criterion associated with an area, determining whether the trigger frame is intended for the UE based on the criterion in the trigger frame, and transmitting a response frame when the trigger frame is intended for the UE. In an aspect, the criterion is an RSSI threshold. In another aspect, the trigger frame indicates whether to enable a collision-mitigation procedure, and the transmission of the response frame is in accordance with a collision-mitigation procedure. In another aspect, the transmission in accordance with the collision-mitigation procedure comprises at least one of a selection of a random CSMA start time in a discovery window for transmitting the response frame or an implementation of a request-to-send/clear-to-send (RTS/CTS) procedure for transmitting the response frame. In another aspect, the computer-readable medium further comprises code for receiving feedback information associated with traffic load conditions, and adjusting parameters associated with the transmission of the response frame using the feedback information. In another aspect, the response frame is transmitted at a time based on a location of the UE relative to a location of the transmitter of the trigger frame. In another aspect, the response frame is transmitted at a time based on a location of the UE in a beam-formed sector. In another aspect, the computer-readable medium further comprises code for refraining from transmitting a response frame when a serving preference rank of the UE is lower than serving preference ranks of neighbor nodes that previously sent response frames received by the UE.

DETAILED DESCRIPTION

Figure 1:
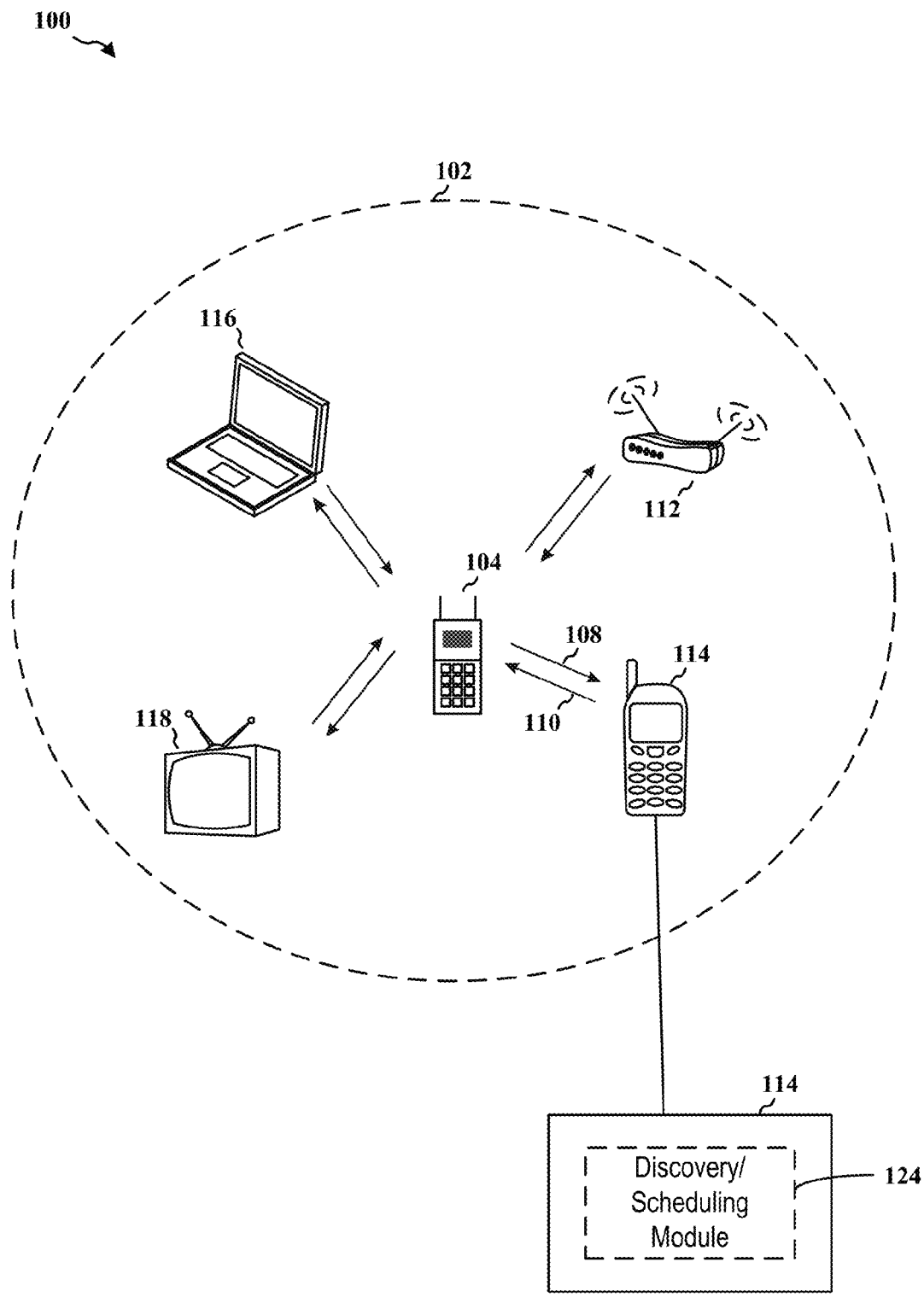
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs" or "UEs"). In general, an AP may serve as a hub or base station for the WLAN and a UE serves as a user of the WLAN. For example, a UE may be a laptop computer, a personal digital assistant (PDA), a mobile phone, etc. In an example, a UE connects to an AP via a WiFi (e.g., IEEE 802.11 protocol) compliant wireless link to obtain general connectivity to the Internet or to other wide area networks. In some implementations a UE may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a UE or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with UEs (e.g., UEs 112, 114, 116, and 118).

A variety of processes and methods may be used for transmissions in the wireless communication system 100 between the AP 104 and the UEs. For example, signals may be sent and received between the AP 104 and the UEs in accordance with OFDM/OFDMA techniques. If this is the case, the wireless communication system 100 may be referred to as an OFDM/OFDMA system. Alternatively, signals may be sent and received between the AP 104 and the UEs in accordance with CDMA techniques. If this is the case, the wireless communication system 100 may be referred to as a CDMA system.

A communication link that facilitates transmission from the AP 104 to one or more of the UEs may be referred to as a downlink (DL) 108, and a communication link that facilitates transmission from one or more of the UEs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the UEs associated with the AP 104 and that use the AP 104 for communication may be referred to as a basic service set (BSS). It should be noted that the wireless communication system 100 may not have a central AP (e.g., AP 104), but rather may function as a peer-to-peer network between the UEs. Accordingly, the functions of the AP 104 described herein may alternatively be performed by one or more of the UEs.

The AP 104 may transmit on one or more channels (e.g., multiple narrowband channels, each channel including a frequency bandwidth) a beacon signal (or simply a "beacon"), via a communication link such as the downlink 108, to other nodes (UEs) of the wireless communication system 100, which may help the other nodes (UEs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a UE (e.g., UE 114) may be required to associate with the AP 104 in order to send communications to and/or to receive communications from the AP 104. In one aspect, information for associating is included in a beacon broadcast by the AP 104. To receive such a beacon, the UE 114 may, for example, perform a broad coverage search over a coverage region. A search may also be performed by the UE 114 by sweeping a coverage region in a lighthouse fashion, for example. After receiving the information for associating, either from the beacon or probe response frames, the UE 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the UE 114 may include one or more modules for performing various functions. For example, the UE 114 may include a discovery/scheduling module 124 configured to perform procedures related to device discovery. In this example, the discovery/scheduling module 124 may be configured to transmit a first trigger frame that includes a first criterion associated with a first area. The first trigger frame may be intended to trigger a first response frame from a first node in the first area. The discovery/scheduling module 124 may be configured to transmit a second trigger frame comprising a second criterion associated with a second area. The second trigger frame may be intended to trigger a second response frame from a second node in the second area.

In another aspect, the discovery/scheduling module 124 may be configured to receive a trigger frame comprising a criterion associated with an area. The discovery/scheduling module 124 may be configured to determine whether the trigger frame is intended for the UE 114 based on the criterion in the trigger frame. The discovery/scheduling module 124 may be configured to transmit a response frame when the trigger frame is intended for the UE 114.

Figure 2:
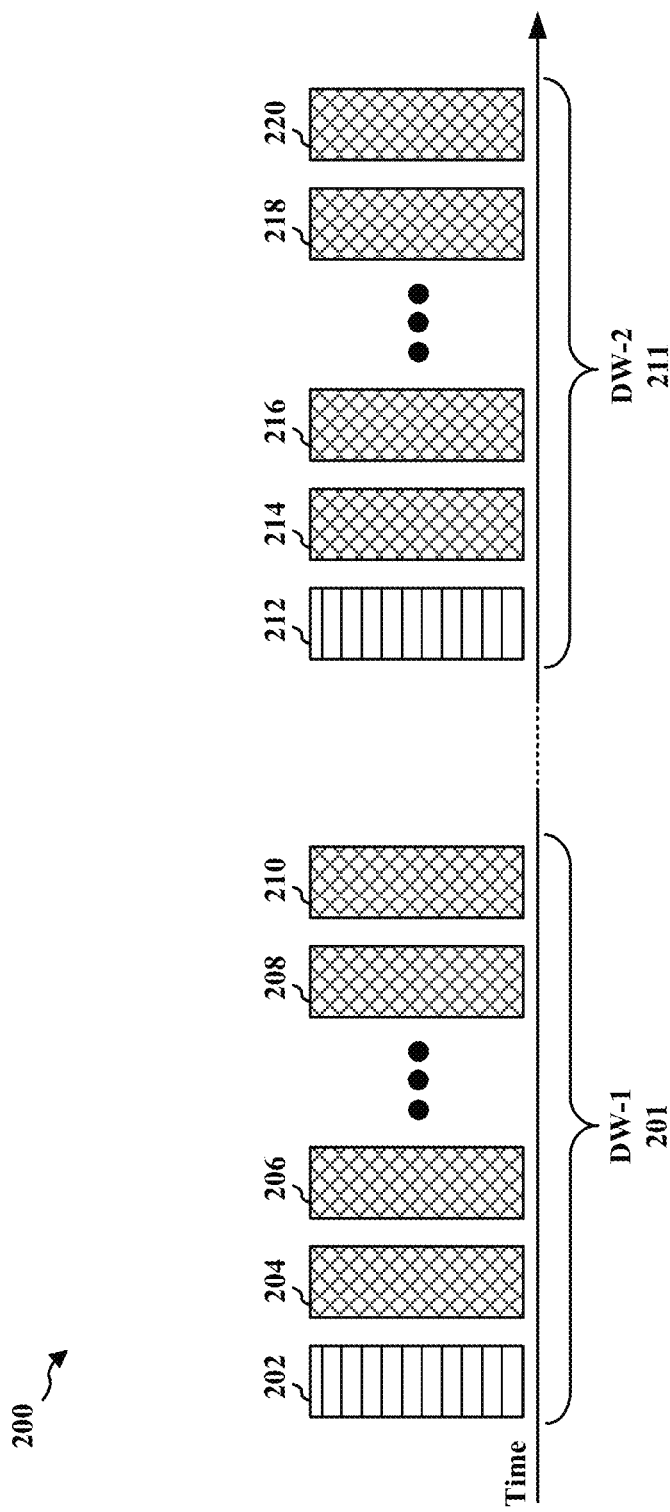
FIG. 2 is a diagram illustrating an example of discovery windows.

FIG. 2 is a diagram 200 illustrating an example of discovery windows. Discovery windows may be used in a neighbor awareness network (NAN). A NAN is an example of a social Wi-Fi network. A NAN may include one or more UEs and/or nodes that communicate with each other without using an infrastructure element, such as an eNB in LTE or an access point (AP) in Wi-Fi. When a UE enters the NAN, the UE will attempt to discover the nodes that already exist in that NAN. To discover the nodes in the NAN, the UE transmits a trigger frame during a first discovery window (DW-1) 201. For example, the UE transmits the trigger frame 202. Nodes in the range of the UE may receive the trigger frame 202. In response to receiving the trigger frame 202, each of the nodes in the NAN transmits a response frame. For example, various nodes in the NAN may transmit the response frames 204, 206, 208, 210. Each response frame (e.g., response frame 204, 206, 208, 210) may include an identifier (ID) of the node transmitting that particular response frame. Upon receiving the response frames (e.g., response frame 204, 206, 208, 210), the UE identifies the nodes in the NAN based on the ID of the nodes that transmitted those response frames. Accordingly, the UE discovers the nodes in the NAN by analyzing the response frame transmitted by each node.

However, in some circumstances, two or more nodes may transmit response frames at approximately the same time. This may occur when a "hidden node" exists. In carrier sense multiple access (CSMA), a node transmits a response frame when that node determines that another node is not transmitting at that time. However, when the first node is located sufficiently far away from a second node, the first node cannot sense (e.g., "hear") the second node. Accordingly, the first node may (inaccurately) determine that another node is not transmitting at that time. In such circumstances, the second node is a "hidden node," at least from the perspective of the first node.

When nodes are "hidden" from each other, such nodes may transmit response frames at approximately the same time. Accordingly, the UE may receive multiple response frames at approximately the same time. Receiving multiple response frames at approximately the same time can cause collision. If two or more response frames undergo collision, the UE may not be able to determine the ID of the nodes transmitting the two or more response frames. Accordingly, the UE is unable to discover the two or more nodes that transmitted the collided responses frames.

Subsequently, the UE will transmit another trigger frame 212 in a second discovery window (DW-2) 211. The trigger frame 212 may indicate the ID of the nodes from which the UE previously received (non-collided) response frames (e.g., response frames 204, 206, 208, 210). Upon receiving the trigger frame 212, the nodes that previously transmitted the (non-collided) response frame (e.g., response frames 204, 206, 208, 210) will refrain from re-transmitting another response frame. However, nodes that previously transmitted a response frame that collided with another response frame will transmit yet another response frame (e.g., response frames 214, 216, 218, or 220) in DW-2. If these response frames do not collide with other response frames, the UE will discover the corresponding nodes during DW-2. Therefore, because of collisions between response frames during DW-1, discovery of some nodes by the UE was delayed from DW-1 to DW-2. Accordingly, collisions can cause an increase in the amount of time needed by the UE to discover all of the nodes in the NAN. As such, a reduction in collisions can reduce the amount of time needed for the UE to discover all of the nodes in the NAN.

Figure 3:
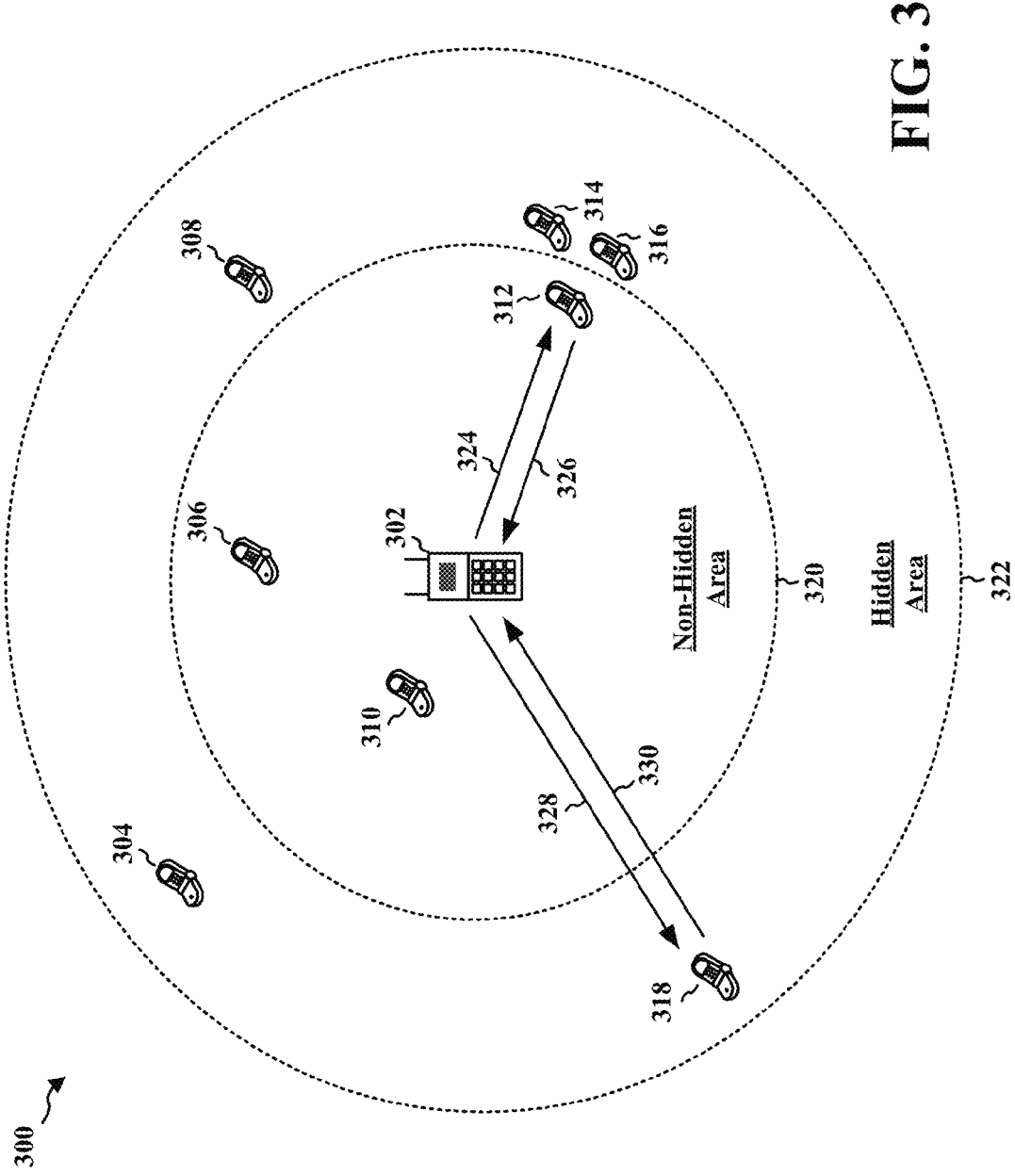
FIGS. 3-8 are diagrams illustrating various examples of communications between the UE and nodes in the range of the UE.

FIG. 3 is a diagram 300 illustrating an example of communications between a UE 302 and nodes 312, 318 in the range 322 of the UE 302. The range 322 may be partitioned 320 into a first area (e.g., the "non-hidden area") and a second area (e.g., the "hidden area"). The first area (e.g., the "non-hidden area") may be located within a radial distance threshold relative to the UE 302. Nodes located in this area can detect and thereby defer to each others' transmissions. The second area (e.g., the "hidden area") may be located beyond the radial distance threshold. Nodes located in this area may not be able to detect and defer to each others' transmissions. In the example illustrated in FIG. 2, the first area (e.g., the "non-hidden area") includes nodes 306, 310, 312, and the second area (e.g., the "hidden area") includes nodes 304, 308, 314, 316, 318. One of ordinary skill in the art will appreciate that the number of nodes shown in the illustrations herein are provided for exemplary purposes and are not intended to limit the scope of the disclosure. One of ordinary skill in that art will also appreciate that partitioning the range 322 into two or more areas (e.g., the "non-hidden area" and the "hidden area") is optional and therefore not a requirement of any of the disclosures provided herein. Accordingly, the disclosures provided herein shall not be limited in any way to partitioning of the range 322 into two or more areas.

During a first discovery window, the UE 302 transmits a trigger frame 324 to a node 312 located in the first area (e.g., the "non-hidden area"). The trigger frame 324 is intended to trigger a response frame 326 from the node 312. During a second discovery window, the UE 302 transmits a trigger frame 328 to a node 318 located in the second area (e.g., the "hidden area"). The trigger frame 328 is intended to trigger a response frame 330 from the node 318. By receiving the response frame 326 and the response frame 330 in different discovery windows, the likelihood of collision between the response frame 326 and the response frame 330 is reduced. Reducing the likelihood of collision can reduce the amount of time needed by the UE 302 to discover the node 312 and the node 318. Additionally, in the event that multiple nodes are located in the second area (e.g., the "hidden area"), certain techniques may be applied to reduce collisions among response frames transmitted by those nodes, as will be discussed infra.

In some configurations, the trigger frame 324 indicates a criterion related to signal strength (or a criterion associated with a first area). The criterion may be a received signal strength indicator (RSSI) threshold (e.g., −70 dBm), a distance threshold (e.g., a radial distance threshold), or a region (e.g., a beam-formed sector, a circular sector). Upon receiving the trigger frame 324, the node 312 determines whether the trigger frame 324 is intended for that node 312. The node 312 determines whether the trigger frame 324 is intended for that particular node based on the criterion related to signal strength (e.g., RSSI threshold) included in the trigger frame 324. For example, the node 312 may compare the RSSI at node 312 with the RSSI threshold indicated in the trigger frame 324. If the RSSI at node 312 is greater than the RSSI threshold indicated in the trigger frame 324, the node 312 may determine that the trigger frame 324 is intended for node 312. As such, a criterion (or RSSI) may be associated with an area when the criterion is intended to trigger a response from a node located within the area. Referring to the above example, the RSSI threshold may be a criterion associated with the non-hidden area because the RSSI threshold is intended to trigger a response from the node 312 within the non-hidden area. The non-hidden area essentially includes locations with RSSI greater than the threshold. The RSSI threshold is not associated with the hidden area because the node 318 would not respond based on the RSSI threshold included in the trigger frame 324.

In another configuration, the trigger frame 324 may include an RSSI range (e.g., −30 dBm to −70 dBm) associated with the non-hidden area. Upon receiving the trigger frame 324, the node 312 determines whether the trigger frame 324 is intended for that node 312 by comparing the RSSI at node 312 with the RSSI range indicated in the trigger frame 324. If the RSSI at node 312 is within the RSSI range indicated in the trigger frame 324, the node 312 may determine that the trigger frame 324 is intended for node 312. By contrast, if the RSSI at node 312 is outside of the RSSI range, then the node 312 may determine that the trigger frame 324 is not intended for node 312. The RSSI range may be a criterion associated with the non-hidden area because the RSSI threshold is intended to trigger a response from the node 312 within the non-hidden area. The RSSI threshold is not associated with the hidden area because the node 318 would not respond based on the RSSI range included in the trigger frame 324.

When the node 312 determines that the trigger frame 324 is intended for that particular node, the node 312 transmits the response frame 326. The node 312 may transmit the response frame 326 based on CSMA protocols. Because nodes located in the "non-hidden area" may be able to sense (e.g., 'hear') each other, the likelihood of collision among their respective response frames is low.

In some configurations, the trigger frame 328 does not indicate the RSSI threshold or indicates a null value for the RSSI threshold. Upon receiving the trigger frame 328, the node 318 determines whether the trigger frame 328 is intended for node 318. The node 318 determines whether the trigger frame 328 is intended for that particular node when the trigger frame 328 does not indicate the RSSI threshold or indicates a null value for the RSSI threshold. When the node 318 determines that the trigger frame 328 is intended for the node 318, the node 318 transmits the response frame 330. In an aspect, the trigger frame 328 may indicate whether to enable a collision-mitigation procedure.

In another aspect, the trigger frame 328 may include an RSSI range (e.g., −71 dBm to −90 dBm) associated with the hidden area. Upon receiving the trigger frame 328, the node 318 may determine whether the trigger frame 328 is intended for the node 318 by comparing the RSSI at the node 318 with the RSSI range. If the RSSI at node 318 is outside of the RSSI range indicated in the trigger frame 328, then the trigger frame 328 was not intended for the node 318. Otherwise, the trigger frame 328 was intended for the node 318.

The node 318 may transmit the response frame 330 in accordance with a collision-mitigation procedure. A collision-mitigation procedure may be utilized because the node 318 is located in the "hidden area." Because the node 318 is in the "hidden area," the node 318 may not sense (e.g., 'hear') other nodes that are located sufficiently far away from the node 318. For example, node 318 may not be able to sense (e.g., 'hear') the nodes 304, 308, 314, and/or 316. The collision-mitigation procedure may decrease the likelihood of collisions, thereby reducing the amount of time needed by the UE 302 to discover all of the nodes in the range 322 of the UE 302.

In some configurations, the collision-mitigation procedure may include selecting a random start time in a discovery window for transmitting the response frame. For example, the node 318 may randomize its CSMA start time for transmitting the response frame 330. If the node 318 does not randomize its CSMA start time for transmitting the response frame 330, the node 318 may transmit the response frame 330 immediately after receiving the trigger frame 328. For example, referring to FIG. 2, the node 318 may receive trigger frame 212 and immediately afterwards transmit the response frame 214. If other nodes (e.g., nodes 304, 308, 314, and/or 316) are also transmitting response frames immediately after receiving the trigger frame 212 (see FIG. 2), then the likelihood of collision among those response frames is high. However, if the node 318 selects a random CSMA start time in the discovery window to transmit the response frame 330, the likelihood of collision of response frame 330 with other response frames from other nodes (e.g., nodes 304, 308, 314, and/or 316) is lower than it would be otherwise.

In some configurations, the collision-mitigation procedure may include using a request-to-send/clear-to-send (RTS/CTS) procedure for transmitting the response frame 330. The node 318 may send, to the UE 302, a RTS message indicating that node 318 is requesting an opportunity to transmit the response frame 330. After receiving the RTS message, the UE 302 may subsequently respond with a CTS message indicating that other nodes (e.g., nodes 304, 308, 314, and/or 316) will temporarily refrain from transmitting their response frames during a duration indicated in the CTS message. By temporarily refraining from transmitting their response frames, the likelihood of collision of the response frame 330 with other response frames (e.g., response frames that would otherwise be transmitted by nodes 304, 308, 314, and/or 316) is reduced.

In some configurations, the UE 302 may include feedback information in the trigger frame 328 transmitted to the node 318. The feedback information may include information associated with traffic load conditions at the UE 302. The node 318 receives the feedback information. The node 318 uses the feedback information to adjust parameters associated with transmission of the response frame 330. The node 318 may adjust the transmission parameters in order to reduce the likelihood of collision among response frames from other nodes.

For example, the UE 302 may determine the traffic load and/or the collision rate at the UE 302. If the traffic load and/or collision rate at the UE 302 exceeds a threshold, the UE 302 may include feedback information in the trigger frame 328 in order for the node 318 to adjust the transmission parameters. One example of a transmission parameter is "K." Generally, the node 318 will select one out of K-number of discovery windows in which to transmit the response frame 330. Accordingly, the frequency of transmission of the response frame 330 is 1/K. By increasing the parameter "K," the frequency of transmission of the response frame 330 decreases. By decreasing the parameter "K," the frequency of transmission of the response frame 330 increases. The parameter "K" may be adjusted in various ways. For example, the feedback information may recommend a particular K-value to which the node 318 should adjust. As another example, the feedback information may include an up- or down-command, whereby the node 318 step-wise increases or decreases its current K-value. By adjusting the transmission parameter "K," the likelihood of collision among response frames decreases.

In some other configurations, the feedback information may indicate a range of MAC addresses of nodes that may transmit response frames during a particular period of time. For example, the feedback information may indicate that nodes with MAC addresses having a last digit ending in the digit zero (0) may transmit response frames at a particular period of time. If node 318 has a MAC address ending in the digit zero (0), the node 318 may transmit the response frame 330. However, if the node 318 has a MAC address ending in the digit one (1), the node 318 may refrain from transmitting the response frame 330. By reducing the number of nodes that are allowed to transmit response frames, the likelihood of collision among response frames decreases.

In some other configurations, the feedback information may indicate a range of RSSI values, and nodes having an RSSI value in that range of RSSI values may transmit their response frame during a period of time. For example, if the RSSI value at node 318 is within the range of RSSI values indicated by the feedback information, the node 318 may transmit the response frame 330. However, if the RSSI value at node 318 is outside of the range of RSSI values indicated by the feedback information, the node 318 may refrain from transmitting the response frame 330. By reducing the number of nodes that are allowed to transmit response frames, the likelihood of collision among response frames decreases.

Figure 4:
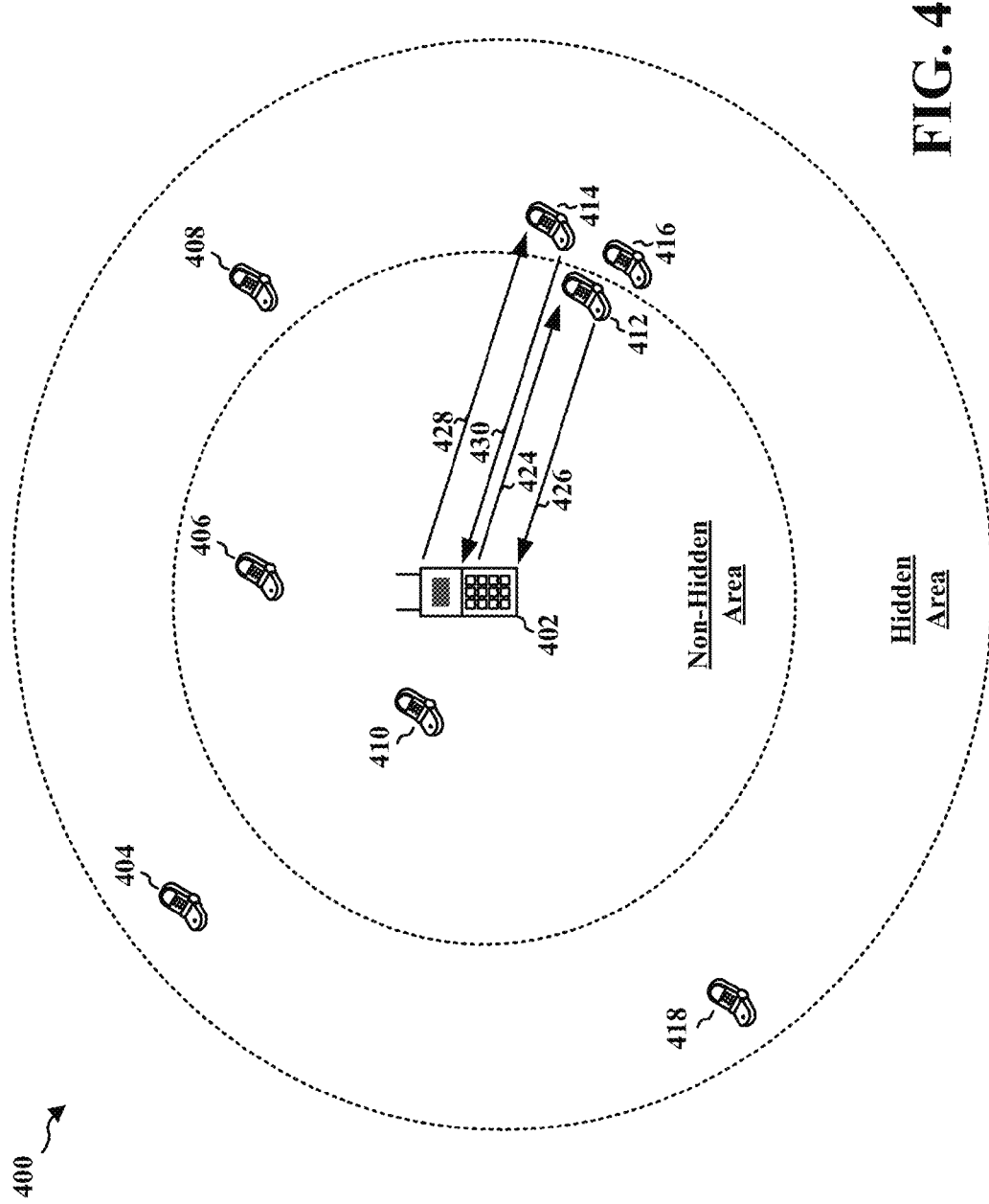

FIG. 4 is a diagram 400 illustrating an example of various communications between a UE 402 and a cluster of nodes. First, the UE 402 transmits a trigger frame 424 to node 412. The trigger frame 424 may indicate an RSSI threshold. The RSSI at node 412 is greater than the RSSI threshold. Node 412 is located on the edge of the "non-hidden area." Nodes located on the edge of the "non-hidden area" will have RSSI values that are a particular percentage above the RSSI threshold. For example, if the RSSI threshold is −70 dBm, the nodes on the edge of the "non-hidden area" may have RSSI values that are up to 10% higher than the RSSI threshold. Accordingly, the UE 402 may determine that nodes having RSSI values in the range −63 dBm to −70 dBm are located on the edge of the "non-hidden area."

In one configuration, in response to receiving the trigger frame 424, the node 412 transmits a response frame 426 to the UE 402. The response frame 426 may include an ID of one or more nodes located near the node 412. All nodes located within a certain radial distance of node 412 may be considered to be located near the node 412. For example, nodes 414, 416 are considered to be located near the node 412 because nodes 414, 416 are located within a certain radial distance relative to node 412. Because node 412 is located on the edge of the "non-hidden area," some nodes located near the node 412 may be located in the "hidden area." In the example illustrated in FIG. 2, nodes 414, 416 are located in the "hidden area."

After receiving the response frame 426, the UE 402 may exclude the IDs of nodes located near the node 412, from which response frames have been previously received. The UE 402 then includes the remaining IDs of the nodes 414, 416 (from which a response frame was not previously received) in the trigger frame 428. The trigger frame 428 is transmitted to the nodes 414, 416. FIG. 4 illustrates trigger frame 428 being transmitted from UE 402 to node 414. Although not illustrated in FIG. 4, one of ordinary skill in the art will understand that trigger frame 428 is also simultaneously transmitted from UE 402 to node 416. Because the trigger frame 428 includes the IDs of nodes 414, 416, nodes 414, 416 will each transmit a response frame. FIG. 4 illustrates response frame 430 being transmitted from node 414 to UE 402. Although not illustrated in FIG. 4, one of ordinary skill in the art will understand another response frame (not shown) is also simultaneously transmitted from node 416 to UE 402. Accordingly, UE 402 receives response frames from nodes 414, 416.

Because the trigger frame 428 includes the IDs of only the nodes that are near the node 412, response frames are not transmitted by other nodes located in the "hidden area." For example, response frames are not transmitted by nodes 404, 408, 418, which are also located in the "hidden area." By limiting the number of nodes that transmit response frames during a period of time, the likelihood of collisions is reduced.

UE 402 receives response frames from all of the nodes in the "non-hidden area" (e.g., nodes 412, 406, 410). Each response frame may indicate the IDs of nodes that are neighbors to those nodes (e.g., neighbors to nodes 412, 406, 410). The UE 402 may adjust parameters used to determine which nodes are located on the edge of the "non-hidden area." For example, the UE 402 may determine that RSSI values that are in the bottom 20% of all RSSIs are located on the edge of the "non-hidden area."

For each of the response frames received from the nodes on the edge of the "non-hidden area," UE 402 may extract the IDs of nodes from which a response frame was not previously received, and UE 402 may subsequently transmit a trigger frame having the IDs of those nodes. The nodes having the IDs included in the trigger frame will respond with a response frame based on CSMA. Once no more response frames are received, the UE 402 may repeat the procedure described supra for a different response frame until all of the response frames received by UE 402 from the nodes on the edge of the "non-hidden area" have been processed. Accordingly, the foregoing procedure facilitates different clusters of nodes providing response frames at different times, thereby reducing the likelihood of collision among their response frames.

In another configuration, in response to receiving the trigger frame 424, the node 412 may transmit a response frame 426 to the UE 402 if the RSSI at the node 412 is greater than (and/or equal to) the RSSI threshold in the trigger frame 424. After receiving the response frame 426, the UE 402 may transmit a trigger frame 428 to the node 414. The trigger frame 428 may include an ID associated with the node 412 and a second RSSI threshold. The node 414 may receive the trigger frame 428 and determine whether the RSSI between the node 414 and the node 412 is greater than the second RSSI threshold. When the RSSI between the node 414 and the node 412 is greater than or equal to the second RSSI threshold, the node 414 may transmit the response frame 430 to the UE 402. However, when the RSSI between the node 414 and the node 412 is less than the second RSSI threshold, the node 414 may refrain from responding. The node 414 may determine that the node 414 is close to the node 412 when the RSSI between the node 414 and the node 412 is greater than or equal to the second RSSI threshold in the trigger frame 428. The node 414 can measure the RSSI between the node 414 and the node 412 based on the response frame 426 sent by the node 412 or any frame previously sent by the node 412.

Figure 5:
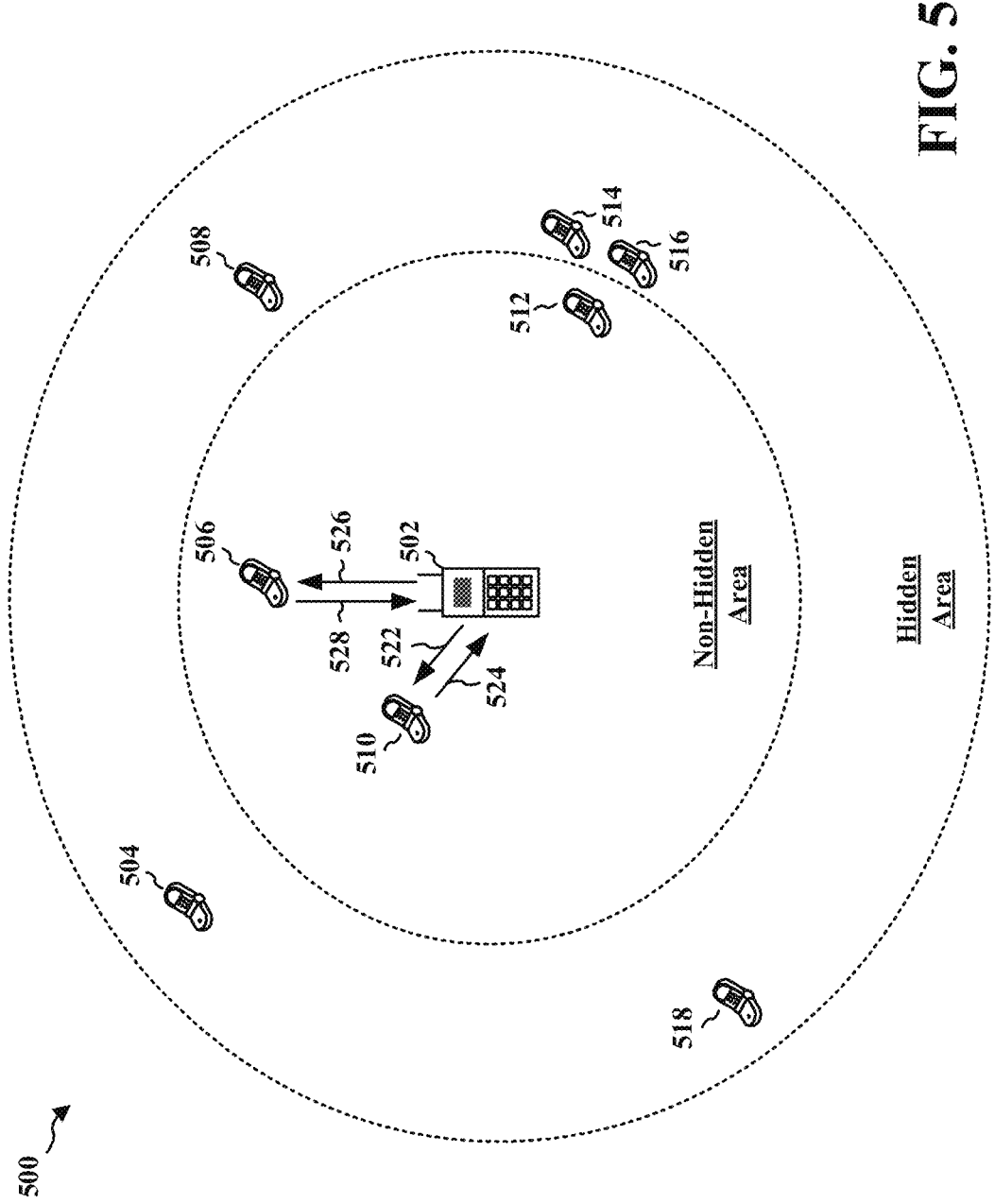

FIG. 5 is a diagram 500 illustrating an example of various communications between a UE 502 and a node located close to the UE 502. First, the UE 502 transmits a trigger frame 522 to node 510, which is located most closely to the UE 502. The UE 502 may determine which node in its range is located most closely to the UE 502 by comparing the RSSI values of the nodes in its range. The node located most closely to the UE 502 has the highest RSSI value. In the example illustrated in FIG. 5, node 510 is located closest to UE 502 because the RSSI value at node 510 is higher than the RSSI value at all other nodes in the range of the UE 502.

The trigger frame 522 includes a request for the node 510 to transmit a list of IDs of other nodes that node 510 discovered prior to receiving the trigger frame 522. In response to receiving the trigger frame 522, the node 510 transmits a response frame 524 including the requested list of IDs. Assuming that node 510 discovered nodes 504, 508, 514, 516, 518 prior to receiving the trigger frame 522, node 510 includes the IDs of nodes 504, 508, 514, 516, 518 in the list. The node 510 transmits the list of IDs to UE 502 in the response frame 524.

The UE 502 receives the list of IDs from node 510. The UE 502 uses the received list of IDs to schedule a time slot during a discovery window for the transmission of response frames by the nodes 504, 508, 514, 516, 518. The UE 502 schedules the time slots in the discovery window such that nodes 504, 508, 514, 516, 518 do not transmit their respective response frames at the same time. Also, the transmission medium is reserved for a sufficient duration to allow for all of the response frames to be transmitted according to the scheduled time slots in the discovery window. After the UE 502 schedules the response frames for nodes 504, 508, 514, 516, 518, the UE 502 transmits a trigger frame (not shown) to nodes 504, 508, 514, 516, 518. The trigger frame transmitted to nodes 504, 508, 514, 516, 518 includes the schedule for the transmission of the response frames by nodes 504, 508, 514, 516, 518. Nodes 504, 508, 514, 516, 518 transmit their response frame at the scheduled time slot in the discovery window. Because nodes 504, 508, 514, 516, 518 transmit their respective response frames at different time slots in the discovery window, the likelihood of collision is reduced. Reducing the likelihood of collision among their respective response frames reduces the amount of time needed by the UE 502 to discover nodes 504, 508, 514, 516, 518.

After nodes 504, 508, 514, 516, 518 transmit their respective response frames, the UE 502 may send a trigger frame to a node that is next-closest to the UE 502. The node located next-closest to the UE 502 will be the node having the next-highest RSSI value (as compared to the RSSI value at node 510). In the example illustrated in FIG. 5, the node that is next-closest to the UE 502 is node 506. The UE 502 transmits trigger frame 526 to node 506. The trigger frame 526 includes a request by the UE 502 for the node 506 to provide a list of IDs of other nodes discovered by node 506 prior to receiving the trigger frame 526. In response to receiving the trigger frame 526, the node 506 transmits response frame 528 to the UE 502. The response frame 528 includes the list of IDs of other nodes located near node 506. Similar features described supra with reference to the node 510 can be applied to node 506 and therefore will not be repeated. However, the UE 502 will not schedule time slots for any response frames for nodes that previously transmitted response frames during a previous discovery window. The UE may repeat the procedure described supra for each of the top X-number or top X-percentage of the closest nodes.

Figure 6:
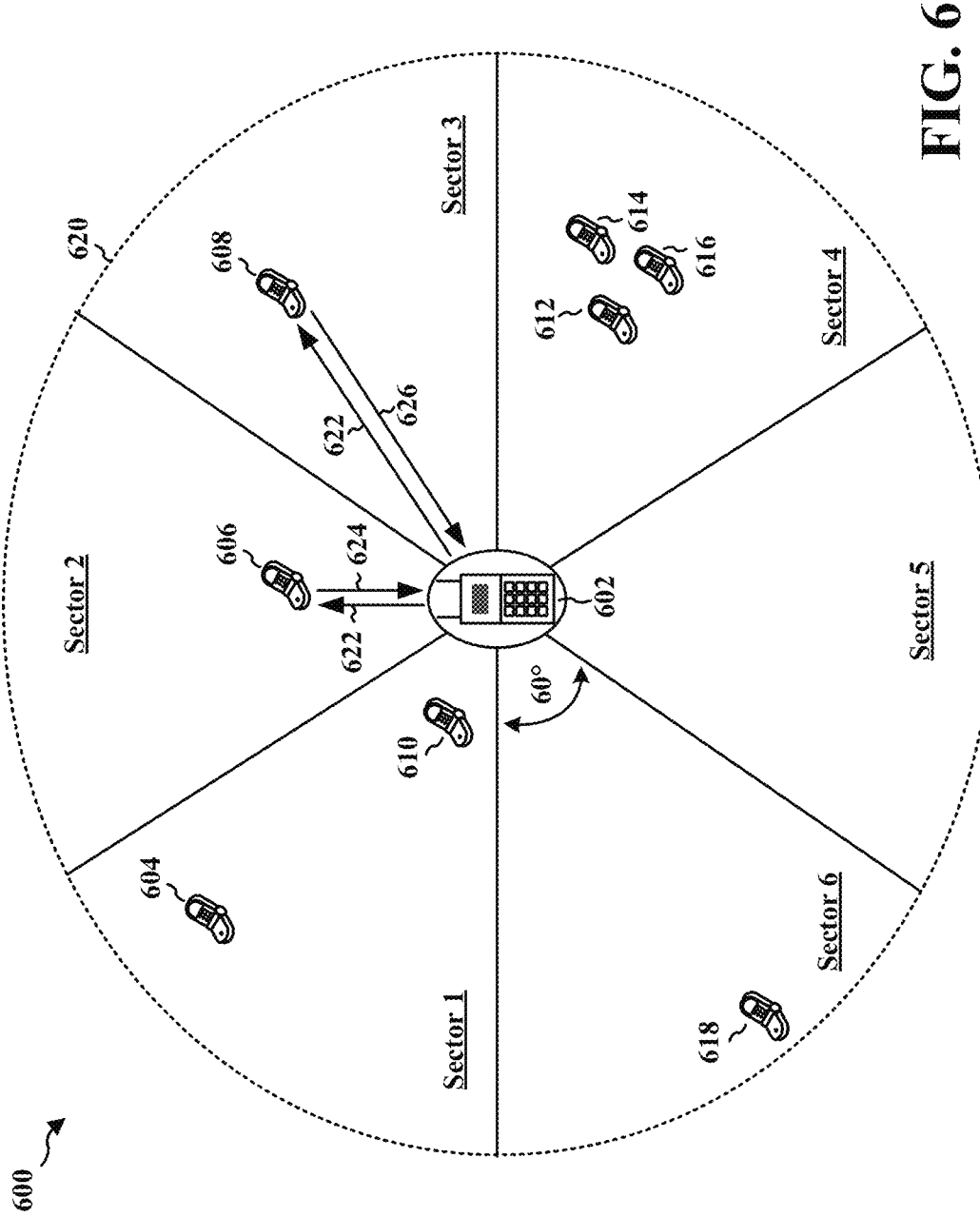

FIG. 6 is a diagram 600 illustrating an example of various communications between a UE 602 and various nodes located in different sectors of a circle (sometimes referred to herein as "circular sectors"). In some configurations, the range 620 of the UE 602 may be partitioned into two or more circular sectors. In the example illustrated in FIG. 6, the range 620 of the UE 602 is partitioned into six circular sectors. Each circular sector covers approximately 60° of the range 620 of the UE 602. However, the size of the sector may be adjusted based on various factors. For example, referring to FIG. 6, the size of sector 4 may be increased because sector 4 has the greatest number of nodes. Therefore, one of ordinary skill in the art will understand that each circular sector does not necessarily have to be the same size. Referring to FIG. 6, nodes 604, 610 are located in sector 1, node 606 is located in sector 2, node 608 is located in sector 3, nodes 612, 614, 616 are located in sector 4, and node 618 is located in sector 6.

In some configurations, the trigger frame indicates the location of the UE 602. The trigger frame may also indicate the time slots for receiving response frames from nodes in its range 620 based on the location of the node relative to the location of the UE 602. For example, the UE 602 transmits trigger frame 622 to nodes 606 and 608. Based on the location information included in the trigger frame 622, node 606 determines that it is located in sector 2, and node 608 determines that it is located in sector 3. The trigger frame 622 indicates that nodes located in sector 2 (e.g., node 606) are scheduled to transmit their response frames (e.g., response frame 624) at time x and that nodes located in sector 3 (e.g., node 608) are scheduled to transmit their response frames (e.g., response frame 626) at time y, where x≠y. Node 606 transmits response frame 624 at time x. Node 608 transmits response frame 626 at time y. Accordingly, response frame 624 is transmitted at a time that is based on the location of the node 606 relative to the location of the UE 602. Similarly, response frame 626 is transmitted at a time that is based on the location of the node 608 relative to the location of the UE 602. Because response frames 624, 626 are transmitted at different times, the likelihood of collision among those response frames is reduced, thereby reducing the amount of time needed by the UE 602 to discover those nodes. Similar procedures described supra with reference to sectors 2 and 3 can be implemented with reference to sectors 1, 4, 5, and 6 and therefore will not be repeated.

Figure 7:
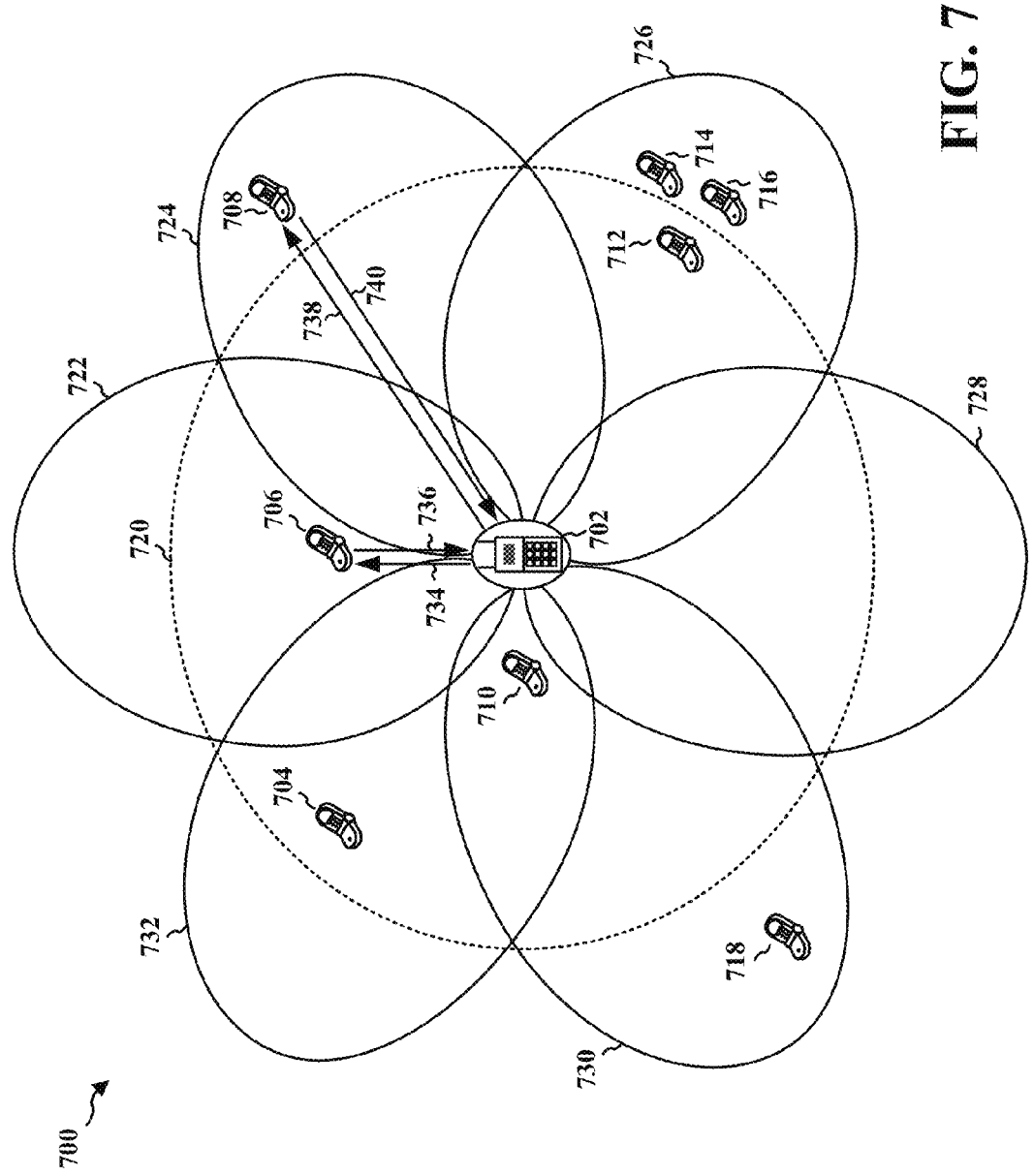

FIG. 7 is a diagram 700 illustrating an example of various communications between a UE 702 and various nodes located in different beam-formed sectors. In some configurations, the UE 702 has multiple antennas. By having multiple antennas, the UE 702 is able to form one or more beams. Each beam may cover an area sometimes referred to herein as a "beam-formed sector." As illustrated in the example shown in FIG. 7, the UE 702 forms six different beams corresponding to beam-formed sectors 722, 724, 726, 728, 730, 732. However, one ordinary skill in the art will understand than any number of beams may be formed without deviating from the scope of the present disclosure. Referring to FIG. 7, nodes 704, 710 are in beam-formed sector 732, node 706 is in beam-formed sector 722, node 708 is in beam-formed sector 724, nodes 712, 714, 716 are in beam-formed sector 726, and node 718 is in beam-formed sector 730.

The UE 702 transmits trigger frame 734 to the nodes located in beam-formed sector 722, which includes node 706. In some configurations, the UE 702 transmits the preamble of the trigger frame 734 using a single antenna (i.e., non-beam-formed). The single-antenna may have the coverage area 720. The UE 702 transmits the remaining portion of the trigger frame 734 using multiple antennas (i.e., beam-formed). The node 706 may determine that it is in beam-formed sector 722 when the RSSI value of the beam-formed portion of the trigger frame 734 is greater than the RSSI value non-beam-formed preamble of the trigger frame 734.

In response to receiving the trigger frame 734, node 706 transmits response frame 736 to the UE 702. Accordingly, response frame 736 is transmitted at a time that is based on the location of the node 706 being in beam-formed sector 722. The UE 702 may also receive response frames from other nodes (not shown) that may also be located in the beam-formed sector 722.

After response frames from all nodes located in beam-formed sector 722 are received by the UE 702, the UE 702 transmits trigger frame 738 to all nodes located in beam-formed sector 724, which includes node 708. In response to receiving the trigger frame 738, node 708 transmits response frame 740 to the UE 702. Accordingly, response frame 740 is transmitted at a time that is based on the location of the node 708 being in beam-formed sector 724. The UE 702 may also receive response frames from other nodes (not shown) that may also be located in the beam-formed sector 724. Because response frames 736, 740 are transmitted at different times, the likelihood of collision among those response frames is reduced, thereby reducing the amount of time needed by the UE 702 to discover those nodes. Similar procedures described supra with reference to beam-formed sectors 722, 724 can be implemented with reference to beam-formed sectors 726, 728, 730, 732 and therefore will not be repeated.

Figure 8:
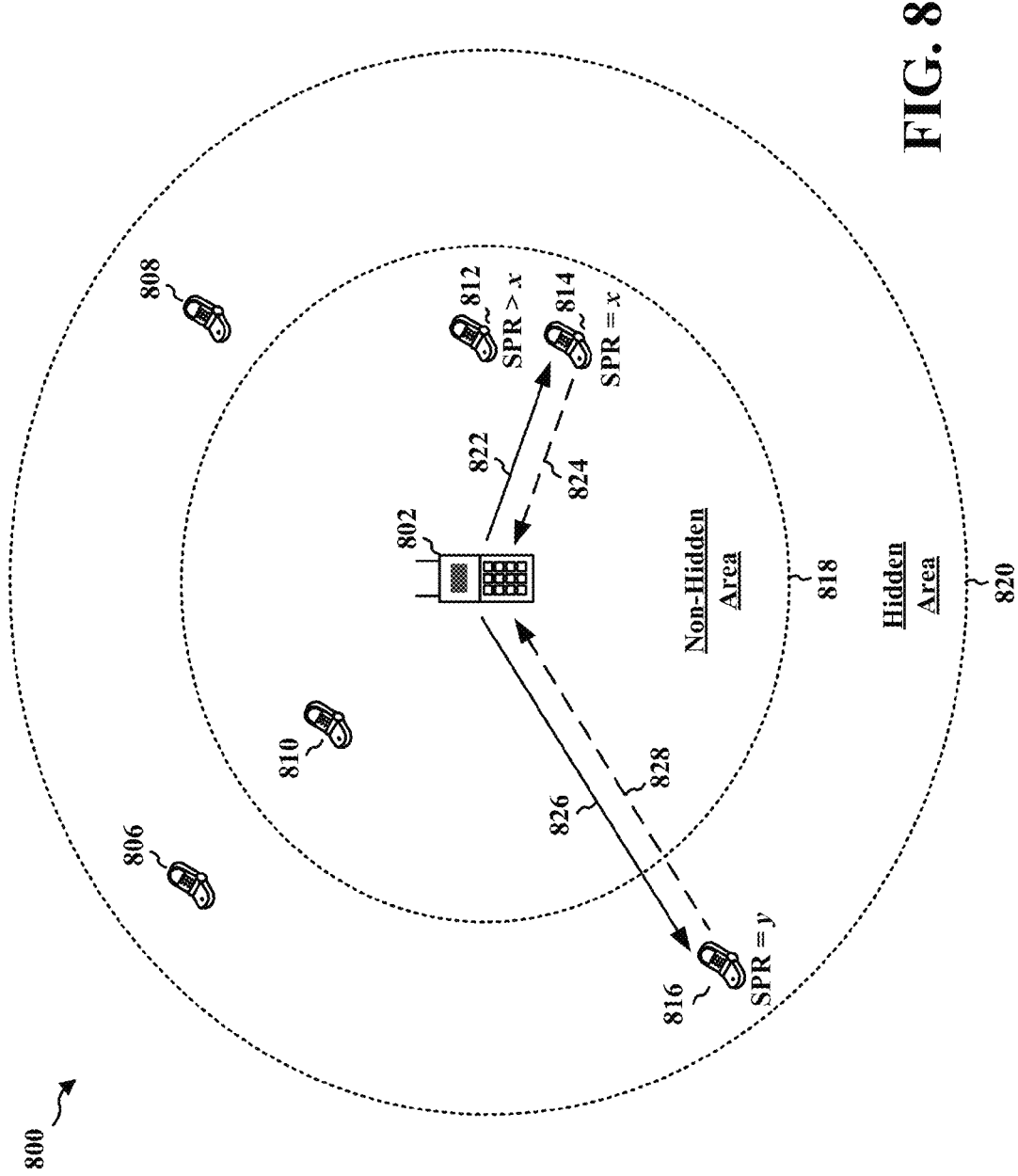

FIG. 8 is a diagram 800 illustrating an example of various communications between a UE 802 and nodes having various serving preference ranks (SPRs). The SPR of a node may correspond to the willingness of that node to provide a requested service. A first node may have a higher SPR relative to a second node when the first node has more battery life, lower mobility, and/or a closer match between provided and requested services. In some configurations, the range 820 of the UE 802 may be partitioned 818 into a "non-hidden area" and a "hidden area." However, as indicated supra, partitioning the range 820 of the UE 802 into two or more areas (e.g., the "non-hidden area" and the "hidden area") is optional and therefore is not a limitation of any disclosure provided herein. Referring to FIG. 8, nodes 810, 812, 814 are located in the "non-hidden area," and nodes 806, 808, 816 are located in the "hidden area."

In some configurations, the UE 802 transmits trigger frame 822 to node 814. In the example illustrated in FIG. 8, node 814 is located in the "non-hidden area." Upon receiving the trigger frame 822, the node 814 may compare its own SPR with the SPR of other nodes located nearby. For example, node 814 may have SPR=x and node 812, which is located nearby node 814, may have SPR>x. Because the SPR of node 814 is less than the SPR of another node located nearby node 814, node 814 may refrain from transmitting the response frame 824 to the UE 802. By refraining from transmitting the response frame 824, node 814 provides an opportunity for node 812 to transmit its own response frame (not shown) without colliding with the response frame 824 from node 814. Additionally or alternatively, the node 814 may stop or slow down the rate of transmitting the response frame 824 when node 814 detects that a nearby node (e.g., node 812) has a higher SPR than the SPR of node 814. For example, node 814 may detect that nearby node 812 has a higher SPR than the SPR of node 814 based on a response frame (not shown) previously received by node 814 from node 812.

In some configurations, the UE 802 transmits trigger frame 826 to node 816. In the example illustrated in FIG. 8, the node 816 is located in the "hidden area." The trigger frame 826 may indicate the highest SPR among all of the SPRs of the nodes in the "non-hidden area." If the SPR of the node 816 is higher than the highest SPR indicated in the trigger frame 826, the node 816 transmits the response frame 828 to the UE 802. For example, the SPR of node 816 is y. If the value of y is greater than the SPR of another node in the "hidden area" (e.g., node 806), then node 816 will transmit the response frame 828 to the UE 802. However, if the value of y is less than or equal to the SPR of that other node (e.g., node 806), then node 816 will refrain from transmitting the response frame 828 to the UE 802. By limiting the number of nodes in the "hidden area" that are allowed to transmit a response frame to the UE 802, the likelihood of collision is reduced, thereby reducing the amount of time required by the UE 802 to discover nodes in its range 820.

Figure 9:
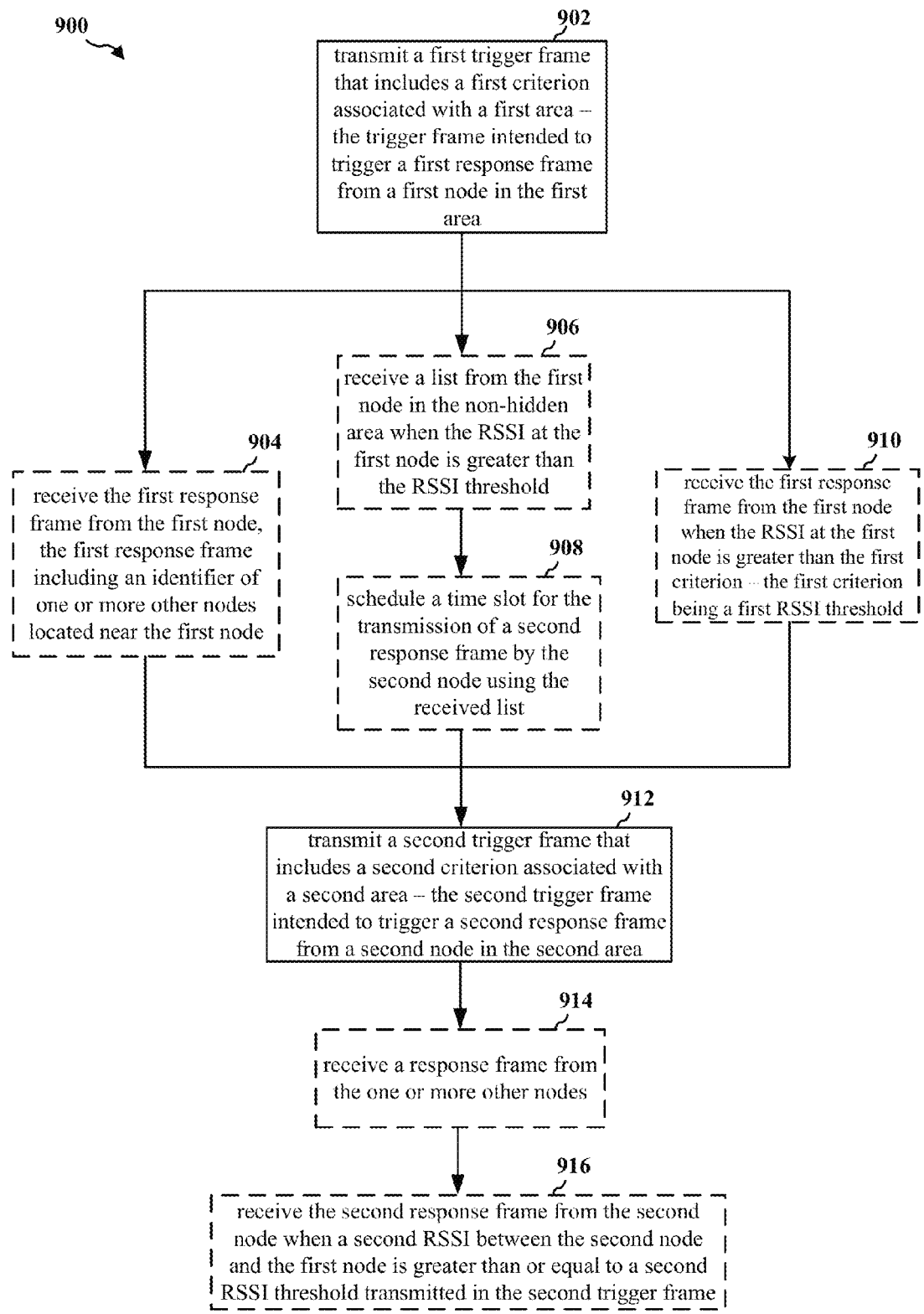
FIG. 9 is a flow chart of a first method of wireless communication.

FIG. 9 is a flow chart 900 of a first method of wireless communication. The method may be performed by a UE. At step 902, the UE transmits a first trigger frame that includes a first criterion associated with a first area. The trigger frame is intended to trigger a first response frame from a first node in the first area. For example, referring to FIG. 3, UE 302 transmits a trigger frame 324 with an RSSI threshold, and the trigger frame 324 is intended to trigger the response frame 326 from node 312 located in the "non-hidden area."

In one configuration, at step 904, the UE may receive the first response frame from the first node. The first response frame may include an identifier of one or more other nodes located near the first node. For example, referring to FIG. 4, the UE 402 receives response frame 426. The response frame 426 includes the IDs of nodes 414, 416 located near node 412.

In another configuration, at step 906, the UE may receive a list from the first node in the non-hidden area when the RSSI at the first node is greater than the RSSI threshold. For example, referring to FIG. 5, the UE 502 receives a response frame 524 containing a list from node 510 in the "non-hidden area" because the RSSI at node 510 is greater than the RSSI threshold. At step 908, the UE may schedule a time slot for the transmission of a second response frame by the second node using the received list. For example, referring to FIG. 5, the UE 502 schedules a time slot for the transmission of response frames from nodes 504, 508, 514, 516, and/or 518 using the received list.

In yet another configuration, at step 910, the UE may receive the first response frame from the first node when the RSSI at the first node is greater than the first criterion, and the first criterion is an RSSI threshold. For example, referring to FIG. 4, the UE 402 receives the response frame 426 from the node 412 when the RSSI at the node 412 is greater than the RSSI threshold included in the trigger frame 424.

At step 912, the UE may transmit a second trigger frame that includes a second criterion associated with a second area, and the second trigger frame may be intended to trigger the second response frame from a second node in the second area. For example, referring to FIG. 3, the UE 302 transmits trigger frame 328 that includes an RSSI threshold associated with the "hidden" area, and the trigger frame 324 is intended to trigger the response frame 330 from node 318 located in the "hidden area."

In some configurations, the UE includes the identifier of one or more other nodes (e.g., node 414) in a second trigger frame (e.g., trigger frame 428). At step 914, the UE receives a response frame from the one or more other nodes. For example, referring to FIG. 4, the UE 402 receives response frame 430 from node 414.

In another configuration, the second trigger frame may include an ID associated with the first node and a second RSSI threshold. In this configuration, at step 916, the UE may receive the second response frame from the second node when a second RSSI between the second node and the first node is greater than or equal to a second RSSI threshold transmitted in the second trigger frame. The second RSSI threshold may be the second criterion. For example, referring to FIG. 4, the UE 402 may receive the response frame 430 from the node 414 when an RSSI between the node 414 and the node 412 is greater than or equal to an RSSI threshold transmitted in the trigger frame 428.

Figure 10:
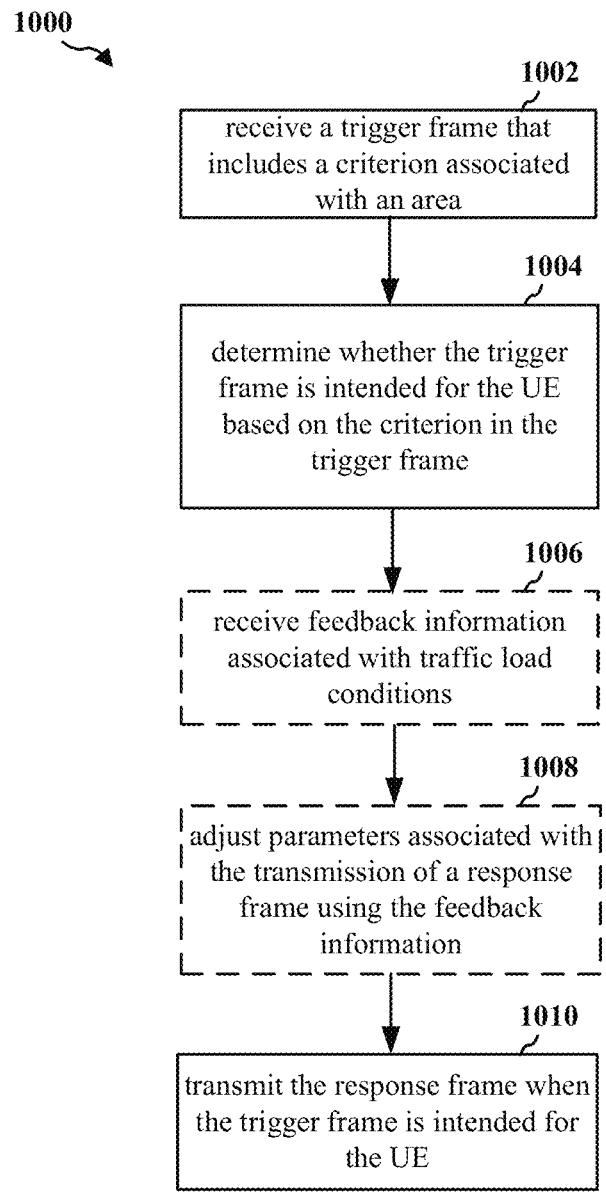
FIG. 10 is a flow chart of a second method of wireless communication.

FIG. 10 is a flow chart 1000 of a second method of wireless communication. The method may be performed by a UE. At step 1002, the UE may receive a trigger frame that includes a criterion associated with an area. For example, referring to FIG. 3, the node 318 receives trigger frame 328 with an RSSI threshold associated with the hidden area.

At step 1004, the UE may determine whether the trigger frame is intended for the UE based on the criterion in the trigger frame. For example, referring to FIG. 3, the node 312 determines that the trigger frame 324 is intended for the node 312 because the RSSI at the node 312 is greater than or equal to the RSSI threshold included in the trigger frame 324. In another example, the node 318 determines that the trigger frame 328 is intended for the node 318 when the trigger frame 328 does not indicate an RSSI threshold or indicates a null value for the RSSI threshold.

In some configurations, at step 1006, the UE may receive feedback information associated with traffic load conditions. For example, referring to FIG. 3, the node 318 receives feedback information associated with traffic load conditions at the UE 302 in the trigger frame 328. At step 1008, the UE may adjust parameters associated with the transmission of a response frame using the feedback information. For example, referring to FIG. 3, the node 318 adjusts parameters associated with the transmission of response frame 330 using the feedback information included in the trigger frame 328. For example, the node 318 may reduce a transmission probability or a frequency parameter if a load or a collision rate is high at the node 302.

At step 1010, the UE may transmit the response frame when the trigger frame is intended for the UE. For example, referring to FIG. 3, the node 318 transmits the response frame 330 when the trigger frame 328 is intended for the node 318.

Figure 11:
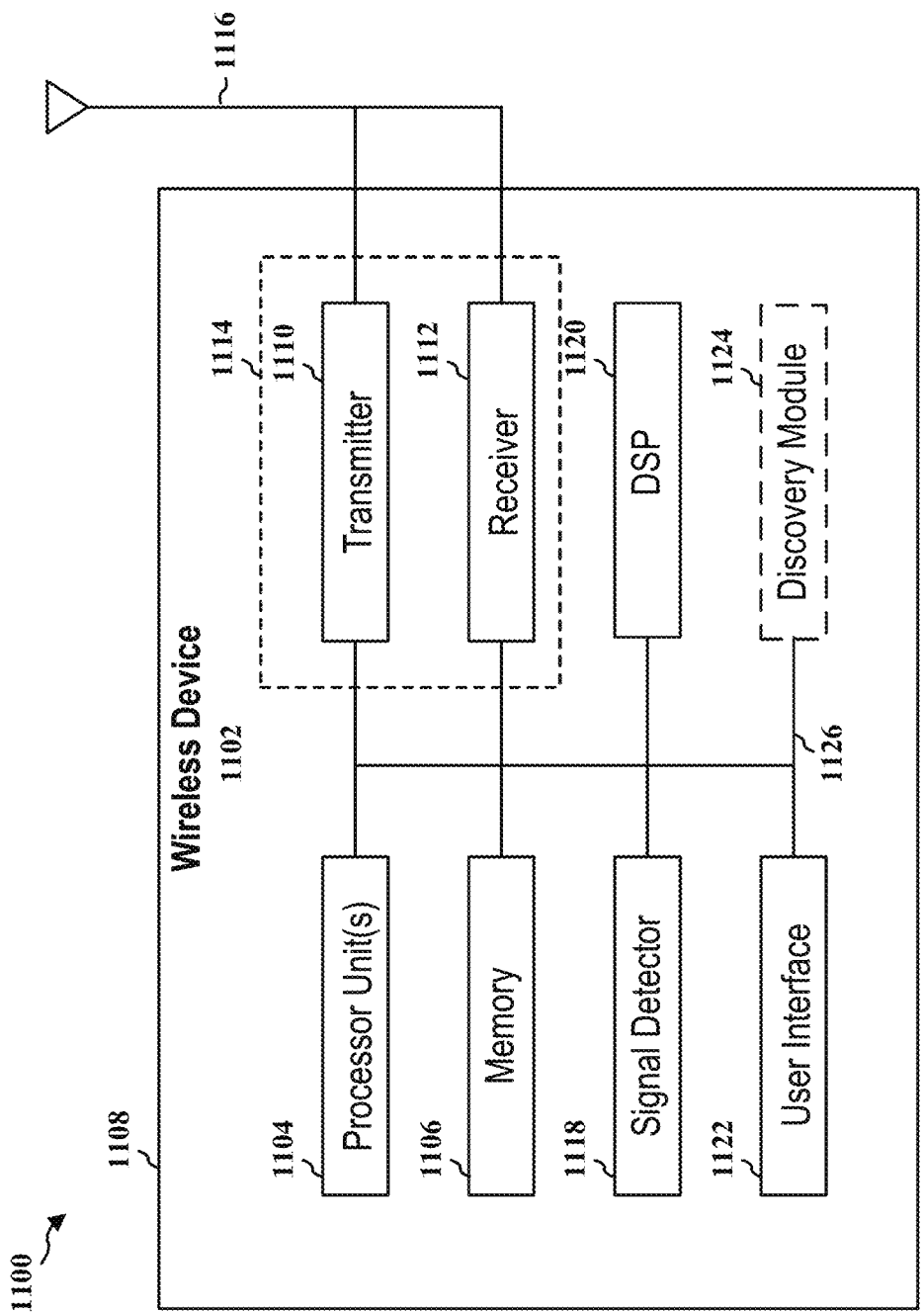
FIG. 11 shows an example functional block diagram of a wireless device that may perform discovery within the wireless communication system of FIG. 1.

FIG. 11 shows an example functional block diagram of a wireless device that may perform discovery within the wireless communication system of FIG. 1. The wireless device 1102 is an example of a device that may be configured to implement the various methods described herein. For example, the wireless device 1102 may comprise one of the UEs 112, 114, 116, and 118.

The wireless device 1102 may include a processor 1104 which controls operation of the wireless device 1102. The processor 1104 may also be referred to as a central processing unit (CPU). Memory 1106, which may include both read-only memory (ROM) and random access memory (RAM), may provide instructions and data to the processor 1104. A portion of the memory 1106 may also include non-volatile random access memory (NVRAM). The processor 1104 typically performs logical and arithmetic operations based on program instructions stored within the memory 1106. The instructions in the memory 1106 may be executable (by the processor 1104, for example) to implement the methods described herein.

The processor 1104 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1102 may also include a housing 1108 that may include a transmitter 1110 and/or a receiver 1112 to allow transmission and reception of data between the wireless device 1102 and a remote device. The transmitter 1110 and the receiver 1112 may be combined into a transceiver 1114. An antenna 1116 may be attached to the housing 1108 and electrically coupled to the transceiver 1114. The wireless device 1102 may also include (not shown) multiple transmitters, multiple receivers, multiple transceivers, and/or multiple antennas.

The wireless device 1102 may also include a signal detector 1118 that may be used to detect and quantify the level of signals received by the transceiver 1114 or the receiver 1112. The signal detector 1118 may detect such signals as total energy, energy per subcarrier per symbol, power spectral density, and other signals. The wireless device 1102 may also include a digital signal processor (DSP) 1120 for use in processing signals. The DSP 1120 may be configured to generate a packet for transmission. In some aspects, the packet may comprise a physical layer data unit (PPDU).

The wireless device 1102 may further comprise a user interface 1122 in some aspects. The user interface 1122 may comprise a keypad, a microphone, a speaker, and/or a display. The user interface 1122 may include any element or component that conveys information to a user of the wireless device 1102 and/or receives input from the user.

When the wireless device 1102 is implemented as a UE (e.g., UE 114), the wireless device 1102 may also comprise a discovery/scheduling module 1124. In one configuration, the discovery/scheduling module 1124 may be configured to transmit a first trigger frame that includes a first criterion associated with a first area. The first trigger frame may be intended to trigger a first response frame from a first node in the first area. The discovery/scheduling module 1124 may be configured to transmit a second trigger frame comprising a second criterion associated with a second area. The second trigger frame may be intended to trigger a second response frame from a second node in the second area. In an aspect, the first area may be located within a radial distance threshold relative to the wireless device 1102, and the second area may be located beyond the radial distance threshold. In another aspect, the first trigger frame may indicate an RSSI threshold. The second trigger frame may not indicate the RSSI threshold or may indicate a null value for the RSSI threshold. In another aspect, the first trigger frame may indicate a first RSSI range. The first trigger frame may be intended to trigger the first response frame from the first node in the first area based on the first RSSI range. The second trigger frame may indicate a second RSSI range. The second trigger frame may be intended to trigger the second response frame from the second node in the second area based on the second RSSI range. In another aspect, the second trigger frame may include feedback information associated with traffic load conditions at the wireless device 1102. In another aspect, the first trigger frame may indicate an RSSI threshold. In this aspect, the discovery/scheduling module 1124 may be configured to receive the first response frame from the first node, and the first response frame may include an identifier of one or more other nodes located near the first node. An RSSI at the first node may be greater than the RSSI threshold, and the second trigger frame may be transmitted with the identifier of each of the one or more other nodes. The discovery/scheduling module 1124 may be configured to receive a response frame from the one or more other nodes. In another aspect, the discovery/scheduling module 1124 may be configured to receive the first response frame from the first node when a first RSSI at the first node is greater than the first criterion. The first criterion may be a first RSSI threshold, and the second trigger frame may be transmitted with an identifier associated with the first node and with a second RSSI threshold. In this aspect, the discovery/scheduling module 1124 may be configured to receive the second response frame from the second node when a second RSSI between the second node and the first node is greater than or equal to the second RSSI threshold transmitted in the second trigger frame. In another aspect, the discovery/scheduling module 1124 may be configured to receive a list from the first node in the first area when an RSSI at the first node is greater than an RSSI threshold. The list may include an identifier of one or more other nodes previously discovered by the first node. The second node may be one of the one or more other nodes. The discovery/scheduling module 1124 may be configured to schedule a time slot for the transmission of the second response frame by the second node using the received list. In another aspect, the first area may be a first circular sector and the second area may be a second circular sector different from the first circular sector. In another aspect, the first and second trigger frames may include information corresponding to a location of the wireless device 1102. The first trigger frame may indicate a first time slot for receiving the first response frame based on a location of the first node relative to the location of the wireless device 1102. The second trigger frame may indicate a second time slot for receiving the second response frame based on a location of the second node relative to the location of the wireless device 1102. In another aspect, the first area may be a first beam-formed sector and the second area may be a second beam-formed sector different from the first beam-formed sector. In another aspect, the first trigger frame may be transmitted to the first node located in the first beam-formed sector at a first time. The second trigger frame may be transmitted to the second node located in the second beam-formed sector at a second time different from the first time.

In another configuration, the discovery/scheduling module 1124 may be configured to receive a trigger frame that includes a criterion associated with an area. The discovery/scheduling module 1124 may be configured to determine whether the trigger frame is intended for the wireless device 1102 based on the criterion in the trigger frame. The discovery/scheduling module 1124 may be configured to transmit a response frame when the trigger frame is intended for the wireless device 1102. In aspect, the criterion may be an RSSI threshold. In another aspect, the trigger frame may indicate whether to enable a collision-mitigation procedure, and the transmission of the response frame may be in accordance with a collision-mitigation procedure. In this aspect, the transmission in accordance with the collision-mitigation procedure may include at least one of a selection of a random start time in a discovery window for transmitting the response frame and an implementation of an RTS/CTS procedure for transmitting the response frame. In another aspect, the discovery/scheduling module 1124 may be configured to receive feedback information associated with traffic load conditions. The discovery/scheduling module 1124 may be configured to adjust parameters associated with the transmission of the response frame using the feedback information. In an aspect, the response frame may be transmitted at a time based on a location of the wireless device 1102 relative to a location of the transmitter of the trigger frame. In another aspect, the response frame may be transmitted at a time based on a location of the wireless device 1102 in a beam-formed sector. In yet another aspect, the discovery/scheduling module 1124 may be configured to refrain from transmitting a response frame when a serving preference rank of the wireless device 1102 is lower than serving preference ranks of neighbor nodes that previously sent response frames received by the wireless device 1102.

Figure 12:
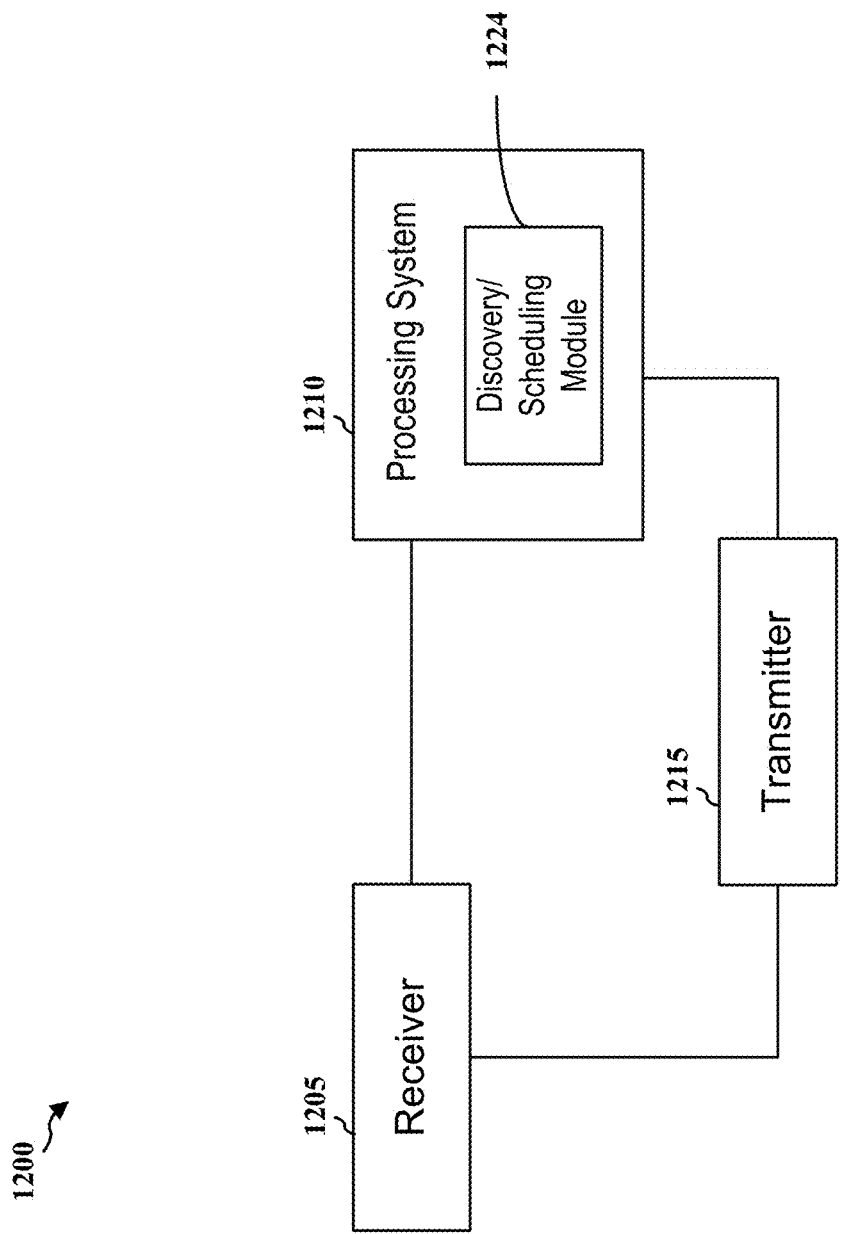
FIG. 12 is a functional block diagram of an example wireless communication device for performing discovery.

FIG. 12 is a functional block diagram of an example wireless communication device 1200 for performing discovery. The wireless communication device 1200 may include a receiver 1205, a processing system 1210, and a transmitter 1215. The processing system 1210 may include a discovery/scheduling module 1224.

In one configuration, the processing system 1210, the discovery/scheduling module 1224, and/or the transmitter 1215 may be configured to transmit a first trigger frame that may include a first criterion associated with a first area. The first trigger frame may be intended to trigger a first response frame from a first node in the first area. The processing system 1210, the discovery/scheduling module 1224, and/or the transmitter 1215 may be configured to transmit a second trigger frame that may include a second criterion associated with a second area. The second trigger frame may be intended to trigger a second response frame from a second node in the second area. In an aspect, the first area may be located within a radial distance threshold relative to the wireless device 1200, and the second area may be located beyond the radial distance threshold. In another aspect, the first trigger frame may indicate an RSSI threshold, and the second trigger frame may not indicate the RSSI threshold or may indicate a null value for the RSSI threshold. In an aspect, the first trigger frame may indicate an RSSI range. The first trigger frame may be intended to trigger the first response frame from the first node in the first area based on the first RSSI range. The second trigger frame may indicate a second RSSI range. The second trigger frame may be intended to trigger the second response frame from the second node in the second area based on the second RSSI range. In an aspect, the second trigger frame may include feedback information associated with traffic load conditions at the wireless device 1200. In another aspect, the first trigger frame may indicate an RSSI threshold, the processing system 1210, the discovery/scheduling module 1224, and/or the receiver 1205 may be configured to receive the first response frame from the first node. The first response frame may include an identifier of one or more other nodes located near the first node. An RSSI at the first node may be greater than the RSSI threshold, and the second trigger frame may be transmitted with the identifier of each of the one or more other nodes. In this aspect, the processing system 1210, the discovery/scheduling module 1224, and/or the receiver 1205 may be configured to receive a response frame from the one or more other nodes. In another aspect, the processing system 1210, the discovery/scheduling module 1224, and/or the receiver 1205 may be configured to receive the first response frame from the first node when an RSSI at the first node may be greater than the first criterion. The first criterion may be a first RSSI threshold, and the second trigger frame may be transmitted with an identifier associated with the first node and with a second RSSI threshold. The processing system 1210, the discovery/scheduling module 1224, and/or the receiver 1205 may be configured to receive the second response frame from the second node when a second RSSI between the second node and the first node is greater than or equal to the second RSSI threshold transmitted in the second trigger frame. The processing system 1210, the discovery/scheduling module 1224, and/or the receiver 1205 may be configured to receive a list from the first node in the first area when an RSSI at the first node is greater than an RSSI threshold. The list may include an identifier of one or more other nodes previously discovered by the first node. The second node may be one of the one or more other nodes. In this aspect, the processing system 1210 and/or the discovery/scheduling module 1224 may be configured to schedule a time slot for the transmission of the second response frame by the second node using the received list. In an aspect, the first area may be a first circular sector and the second area may be a second circular sector different from the first circular sector. In another aspect, the first and second trigger frames may include information corresponding to a location of the wireless communication device 1200. In this aspect, the first trigger frame may indicate a first time slot for receiving the first response frame based on a location of the first node relative to the location of the wireless device 1200. The second trigger frame may indicate a second time slot for receiving the second response frame based on a location of the second node relative to the location of the wireless device 1200. In another aspect, the first area may be a first beam-formed sector and the second area may be a second beam-formed sector different from the first beam-formed sector. In another aspect, the first trigger frame may be transmitted to the first node located in the first beam-formed sector at a first time. The second trigger frame may be transmitted to the second node located in the second beam-formed sector at a second time different from the first time.

In this configuration, the receiver 1205, the processing system 1210, the discovery/scheduling module 1224, and/or the transmitter 1215 may be configured to perform one or more functions discussed above with respect to blocks 902, 904, 906, 908, 910, 912, 914, and 916 of FIG. 9. The receiver 1205 may correspond to the receiver 1112. The processing system 1210 may correspond to the processor 1104. The transmitter 1215 may correspond to the transmitter 1110. The discovery/scheduling module 1224 may correspond to the discovery/scheduling module 124 and/or the discovery/scheduling module 1124.

In another configuration, the processing system 1210, the discovery/scheduling module 1224, and/or the receiver 1205 may be configured to receive a trigger frame that includes a criterion associated with an area. The processing system 1210 and/or the discovery/scheduling module 1124 may be configured to determine whether the trigger frame is intended for the wireless communication device 1200 based on the criterion in the trigger frame. The processing system 1210, the discovery/scheduling module 1124, and/or the transmitter 1215 may be configured to transmit a response frame when the trigger frame is intended for the wireless communication device 1200. In an aspect, the criterion may be an RSSI threshold. In another aspect, the trigger frame may indicate whether to enable a collision-mitigation procedure, and the transmission of the response frame may be in accordance with a collision-mitigation procedure. In another aspect, the transmission in accordance with the collision-mitigation procedure may include at least one of a selection of a random start time in a discovery window for transmitting the response frame and an implementation of a request-to-send/clear-to-send (RTS/CTS) procedure for transmitting the response frame. In another aspect, the processing system 1210, the discovery/scheduling module 1224, and/or the receiver 1205 may be configured to receive feedback information associated with traffic load conditions. In this aspect, the processing system 1210 and/or the discovery/scheduling module 1224 may be configured to adjust parameters associated with the transmission of the response frame using the feedback information. In another aspect, the response frame may be transmitted at a time based on a location of the wireless communication device 1200 relative to a location of the transmitter of the trigger frame. In another aspect, the response frame may be transmitted at a time based on a location of the wireless communication device 1200 in a beam-formed sector. In another aspect, the processing system 1210 and/or the discovery/scheduling module 1124 may be configured to refrain from transmitting a response frame when a serving preference rank of the wireless communication device 1200 is lower than serving preference ranks of neighbor nodes that previously sent response frames received by the wireless communication device 1200.

In this configuration, the receiver 1205, the processing system 1210, the discovery/scheduling module 1224, and/or the transmitter 1215 may be configured to perform one or more functions discussed above with respect to blocks 1002, 1004, 1006, 1008, and 1010 of FIG. 10. The receiver 1205 may correspond to the receiver 1112. The processing system 1210 may correspond to the processor 1104. The transmitter 1215 may correspond to the transmitter 1110. The discovery/scheduling module 1224 may correspond to the discovery/scheduling module 124 and/or the discovery/scheduling module 1124.

Moreover, means for transmitting may include the processing system 1210, the discovery/scheduling module 1224, and/or the transmitter 1215. Means for determining whether the trigger frame is intended for the wireless communication device 1200 may include the processing system 1210 and/or the discovery/scheduling module 1224. Means for receiving may include the processing system 1210, the discovery/scheduling module 1224, and/or the receiver 1205. Means for scheduling may include the processing system 1210 and/or the discovery/scheduling module 1224.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A method for wireless communication by a user equipment (UE), comprising:
   transmitting a first trigger frame comprising a first criterion associated with a first area, wherein the first trigger frame is intended to trigger a first response frame from a first node in the first area, and wherein the first trigger frame indicates a received signal strength indicator (RSSI) threshold;
   receiving the first response frame from the first node, the first response frame comprising an identifier of one or more other nodes located near the first node, wherein an RSSI at the first node is greater than the RSSI threshold;
   transmitting a second trigger frame comprising a second criterion associated with a second area, wherein the second trigger frame is intended to trigger a second response frame from a second node in the second area, and wherein the second trigger frame is transmitted with the identifier of each of the one or more other nodes; and
   receiving the second response frame from the one or more other nodes.

2. The method of claim 1, wherein the first area is located within a radial distance threshold relative to the UE, and wherein the second area is located beyond the radial distance threshold.

3. The method of claim 2, wherein the second trigger frame includes feedback information associated with traffic load conditions at the UE.

4. The method of claim 1, further comprising:
   receiving a list from the first node in the first area when the RSSI at the first node is greater than the first RSSI threshold, the list comprising identifiers of the one or more other nodes; and
   scheduling a time slot for a transmission of the second response frame by the second node using the received list, wherein the second node is one of the one or more other nodes.

5. A method for wireless communication by a user equipment (UE), comprising:
   transmitting a first trigger frame comprising a first criterion associated with a first area, wherein the first trigger frame is intended to trigger a first response frame from a first node in the first area; and
   transmitting a second trigger frame comprising a second criterion associated with a second area, wherein the second trigger frame is intended to trigger a second response frame from a second node in the second area, wherein the first area is a first circular sector and the second area is a second circular sector different from the first circular sector,
   wherein the first and second trigger frames include information corresponding to a location of the UE, the first trigger frame indicates a first time slot for receiving the first response frame based on a location of the first node relative to the location of the UE, and the second trigger frame indicates a second time slot for receiving the second response frame based on a location of the second node relative to the location of the UE.

6. A method of wireless communication by a user equipment (UE), comprising:
   receiving a trigger frame comprising a criterion associated with an area;
   determining whether the trigger frame is intended for the UE based on the criterion in the trigger frame;
   transmitting a response frame when the trigger frame is intended for the UE; and
   refraining from transmitting the response frame when a serving preference rank of the UE is lower than serving preference ranks of neighbor nodes that previously sent response frames received by the UE.

7. The method of claim 6, wherein the trigger frame indicates whether to enable a collision-mitigation procedure, and wherein the transmission of the response frame is in accordance with a collision-mitigation procedure.

8. A user equipment (UE) for wireless communication, comprising:
   a memory; and
   at least one processor coupled to the memory and configured to:
      transmit a first trigger frame comprising a first criterion associated with a first area, wherein the first trigger frame is intended to trigger a first response frame from a first node in the first area, and wherein the first trigger frame indicates a received signal strength indicator (RSSI) threshold;
      the first response frame from the first node, the first response frame comprising an identifier of one or more other nodes located near the first node, wherein an RSSI at the first node is greater than the RSSI threshold;
      transmit a second trigger frame comprising a second criterion associated with a second area, wherein the second trigger frame is intended to trigger a second response frame from a second node in the second area, and wherein the second trigger frame is transmitted with the identifier of each of the one or more other nodes; and
      receiving the second response frame from the one or more other nodes.

9. The UE of claim 8, wherein the first area is located within a radial distance threshold relative to the UE, and wherein the second area is located beyond the radial distance threshold.

10. The UE of claim 9, wherein the second trigger frame includes feedback information associated with traffic load conditions at the UE.

11. The UE of claim 8, wherein the at least one processor is further configured to:
    receive a list from the first node in the first area when the RSSI at the first node is greater than the first RSSI threshold, the list comprising identifiers of one or more other nodes; and
    schedule a time slot for a transmission of the second response frame by the second node using the received list, wherein the second node is one of the one or more other nodes.

12. A user equipment (UE) for wireless communication, comprising:
    a memory; and
    at least one processor coupled to the memory and configured to:
       receive a trigger frame comprising a criterion associated with an area;
       determine whether the trigger frame is intended for the UE based on the criterion included in the trigger frame;
       transmit a response frame when the trigger frame is intended for the UE; and
       refrain from transmitting the response frame when a serving preference rank of the UE is lower than serving preference ranks of neighbor nodes that previously sent response frames received by the UE.

13. A user equipment (UE) for wireless communication, comprising:
- a memory; and
- at least one processor coupled to the memory and configured to:
  - transmit a first trigger frame comprising a first criterion associated with a first area, wherein the first trigger frame is intended to trigger a first response frame from a first node in the first area; and
  - transmit a second trigger frame comprising a second criterion associated with a second area, wherein the second trigger frame is intended to trigger a second response frame from a second node in the second area, wherein the first area is a first circular sector and the second area is a second circular sector different from the first circular sector,
  - wherein the first and second trigger frames include information corresponding to a location of the UE, the first trigger frame indicates a first time slot for receiving the first response frame based on a location of the first node relative to the location of the UE, and the second trigger frame indicates a second time slot for receiving the second response frame based on a location of the second node relative to the location of the UE.

* * * * *